US012802623B2

(12) United States Patent
Jia et al.

(10) Patent No.: US 12,802,623 B2
(45) Date of Patent: Nov. 17, 2026

(54) ARRAY SUBSTRATE, DISPLAY PANEL AND DISPLAY APPARATUS

(71) Applicant: Tianma Advanced Display Technology Institute (Xiamen) Co., Ltd., Xiamen (CN)

(72) Inventors: Zhenyu Jia, Xiamen (CN); Kerui Xi, Xiamen (CN); Tianyi Wu, Xiamen (CN); Wenxin Jiang, Xiamen (CN); Yingteng Zhai, Xiamen (CN); Bo Yang, Xiamen (CN); Fanqing Meng, Xiamen (CN)

(73) Assignee: TIANMA ADVANCED DISPLAY TECHNOLOGY INSTITUTE (XIAMEN) CO., LTD., Xiamen (CN)

( * ) Notice: Subject to any disclaimer, the term of this patent is extended or adjusted under 35 U.S.C. 154(b) by 0 days.

(21) Appl. No.: 19/083,471

(22) Filed: Mar. 19, 2025

(65) Prior Publication Data

US 2026/0188181 A1 Jul. 2, 2026

(30) Foreign Application Priority Data

Dec. 31, 2024 (CN) ......................... 202411996450.0

(51) Int. Cl.
*G09G 3/32* (2016.01)

(52) U.S. Cl.
CPC ....... *G09G 3/32* (2013.01); *G09G 2300/0426* (2013.01); *G09G 2310/0286* (2013.01); *G09G 2330/04* (2013.01)

(58) Field of Classification Search
CPC ............. G09G 3/32; G09G 2300/0426; G09G 2310/0286; G09G 2330/04
See application file for complete search history.

(56) References Cited

U.S. PATENT DOCUMENTS 8,558,777 B2 * 10/2013 Jang .......................... G09G 3/20 377/64
2003/0189542 A1 10/2003 Lee et al.
(Continued)

FOREIGN PATENT DOCUMENTS

CN 112331127 A 2/2021
CN 114299842 A 4/2022
(Continued)

OTHER PUBLICATIONS

The First Office Action dated Oct. 21, 2025 for Chinese Application No. 202411996450.0 , 8 pages.
(Continued)

*Primary Examiner* — Ke Xiao
(74) *Attorney, Agent, or Firm* — East IP P.C.

(57) ABSTRACT

An array substrate, a display panel and a display apparatus are provided in the present application, wherein the array substrate includes a gate driving circuit and a detection signal line, the gate driving circuit includes a shift register group and a virtual register, the shift register group includes N shift registers arranged in cascade, the virtual register is cascaded to the shift register at an N-th stage, and the detection signal line is electrically connected to an output end of the virtual register. The shift register at a last row can be isolated from the detection signal line by means of the virtual register, thereby reducing the display difference of the last row or several rows of light-emitting elements with respect to the light-emitting elements at other rows, and improving the display uniformity of the display panel.

20 Claims, 11 Drawing Sheets

(56) References Cited

U.S. PATENT DOCUMENTS

| | | | | |
|---|---|---|---|---|
| 2006/0227093 | A1* | 10/2006 | Jang | G11C 19/28 345/100 |
| 2007/0052658 | A1* | 3/2007 | Kim | G09G 3/3677 345/100 |
| 2007/0152934 | A1* | 7/2007 | Maeda | G09G 3/3233 345/92 |
| 2020/0035177 | A1 | 1/2020 | Kawachi | |
| 2020/0251066 | A1 | 8/2020 | Hu et al. | |
| 2021/0225217 | A1* | 7/2021 | Wu | G09G 3/006 |
| 2024/0005871 | A1 | 1/2024 | Zhang | |
| 2024/0321191 | A1 | 9/2024 | Dai et al. | |

FOREIGN PATENT DOCUMENTS

| | | | |
|---|---|---|---|
| CN | 116844447 | A | 10/2023 |
| CN | 118887903 | A | 11/2024 |
| CN | 119133185 | A | 12/2024 |

OTHER PUBLICATIONS

The Second Office Action dated Apr. 9, 2026 for CN Application No. 202411996450.0 , 16 pages.

The partial European search report issued on Feb. 13, 2026 in European Patent Application No. 25227768.6 , 15 pages.

The EESR dated May 27, 2026 for EP Application No. 25227768.6, 20 pages.

* cited by examiner

ARRAY SUBSTRATE, DISPLAY PANEL AND DISPLAY APPARATUS

CROSS-REFERENCE TO RELATED APPLICATIONS

This application claims priority to Chinese Patent Application No. 202411996450.0, titled "ARRAY SUBSTRATE, DISPLAY PANEL AND DISPLAY APPARATUS" and filed on Dec. 31, 2024, which is hereby incorporated by reference in its entirety.

TECHNICAL FIELD

The present application relates to the technical field of display apparatus, and in particular to an array substrate, a display panel and a display apparatus.

BACKGROUND

With the development of science and technology, the field of display panels has also achieved tremendous progress and diversified development. On this basis, people's requirements for display panels are also increasing day by day. How to improve the reliability of display panels while meeting performance requirements has become one of the research directions of manufacturers.

SUMMARY

The embodiments of the present application provide an array substrate, a display panel and a display apparatus, which can improve the reliability of the display panel.

In the first aspect, the embodiments of the present application provide an array substrate, the array substrate includes a gate driving circuit and a detection signal line, the gate driving circuit includes a shift register group and a virtual register, the shift register group includes N shift registers arranged in cascade, the virtual register is cascaded to the shift register at an N-th stage, and the detection signal line is electrically connected to an output end of the virtual register.

In the second aspect, the embodiments of the present application provide a display panel, the display panel includes the array substrate and a light-emitting element in any one of the aforementioned embodiments.

In the third aspect, the embodiments of the present application provide a display apparatus, the display apparatus includes the display panel in any one of the aforementioned embodiments.

BRIEF DESCRIPTION OF THE DRAWINGS

In order to more clearly illustrate the technical solution of the embodiments of the present application, the drawings required for use in the embodiments of the present application are briefly introduced below. For those skilled in the art, other drawings can be obtained based on these drawings without creative work.

REFERENCE NUMERALS

Figure 1:
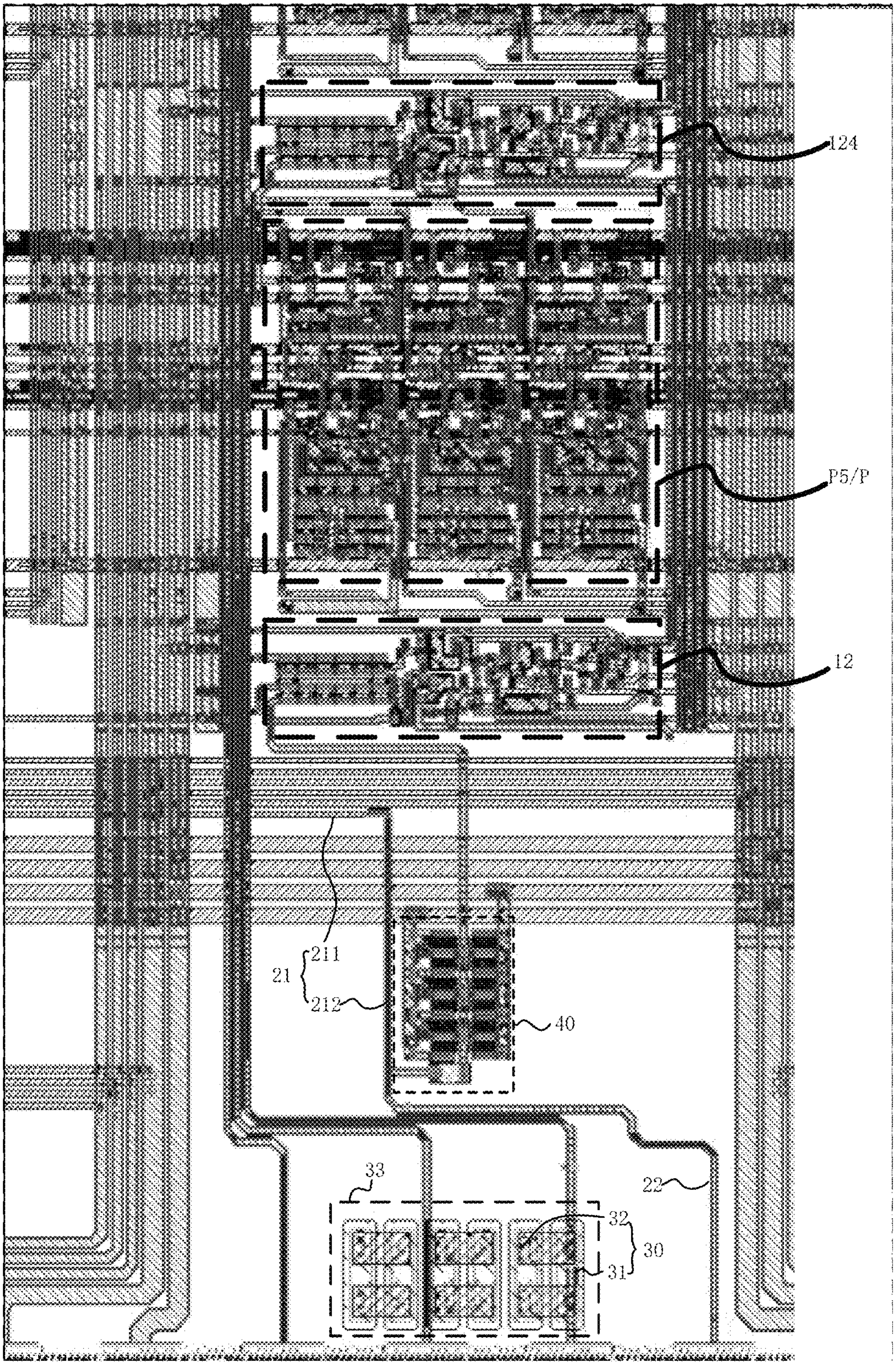
FIG. 1 is a structural schematic diagram of a local circuit in an array substrate provided in an embodiment of the present application.

100, array substrate; 200, display panel; 300, display apparatus;

10, gate driving circuit; 11, shift register; 111, shift register at an N-th stage; 12, virtual register; 121, first virtual register; 122, second virtual register; 123, third virtual register; 13, first gate driving circuit; 10*a*, first type of gate driving circuit; 10*b*, second type of gate driving circuit; 10*c*, third type of gate driving circuit; S, shift register group;

20, detection signal line; 21, first trace; 211, first sub-portion; 212, connecting portion; 22, second trace;

30, electrode structure; 31, first connection electrode; 32, second connection electrode; 33, first electrode group;

40, electrostatic shielding unit;

50, substrate;

60, bonding pad structure; 61, first bonding pad; 62, second bonding pad;

70, circuit board structure;

P, pixel circuit; P1, pulse width modulation subcircuit; P2, amplitude modulation subcircuit; P3, circuit row; P4, circuit column; P5, M-th circuit row; F, light-emitting element;

X, first direction; Y, second direction; Z, thickness direction.

DETAILED DESCRIPTION

The features and exemplary embodiments of various aspects of the present application will be described in detail below. In order to make the purpose, technical solutions and advantages of the present application clearer, the present application is further described in detail below in conjunction with the drawings and specific embodiments. It should be understood that the specific embodiments described herein are intended only to explain the present application, rather than to limit the present application. For those skilled in the art, the present application can be implemented without some of these specific details. The following description of the embodiments is only to provide a better understanding of the present application by showing examples of the present application.

It should be noted that in the present application, relational terms such as first and second, etc. are only used to distinguish one entity or operation from another entity or operation, and do not necessarily require or imply any such actual relationship or order between these entities or operations. Moreover, the terms "include", "comprise" or any other variant thereof are intended to cover non-exclusive inclusion, so that a process, method, article or apparatus including a series of elements includes not only those elements, but also other elements not explicitly listed, or also includes elements inherent to such a process, method, article or apparatus. In the absence of further restrictions, the elements defined by the sentence "include . . . " do not exclude the existence of other identical elements in the process, method, article or apparatus including the elements.

There are many types of display panels. Micro-luminescent display panels have received widespread attention due to their advantages such as higher brightness and wider color gamut. Micro-luminescent display panels use micro devices such as micro light-emitting diodes (Micro Light Emitting Diode, Micro LED) or sub-millimeter light-emitting diodes (Mini Light Emitting Diode, Mini LED) as light-emitting elements to achieve light-emitting display functions. On this basis, how to improve the display reliability of micro-luminescent display panels has become one of the research directions of many manufacturers.

Figure 2:
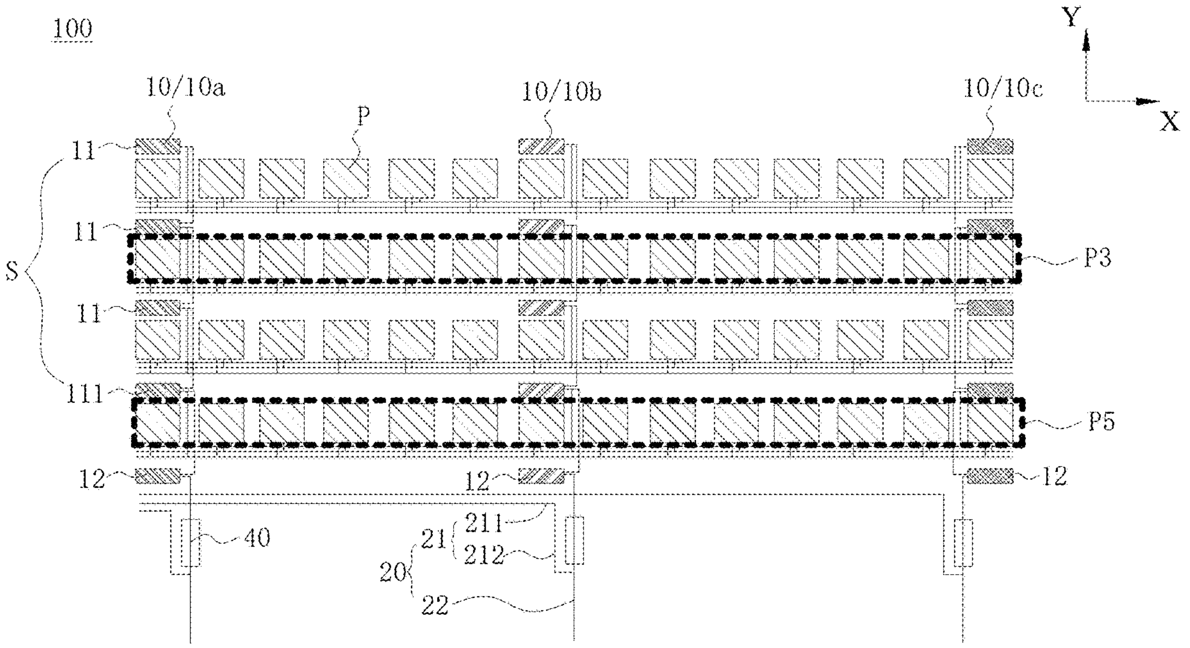
FIG. 2 is a simple structural schematic diagram of a local circuit in an array substrate provided in an embodiment of the present application.

In view of the above problems, in a first aspect, refer to FIGS. 1 to 3, the embodiments of the present application provide an array substrate 100, which includes a gate driving circuit 10 and a detection signal line 20. The gate driving circuit 10 includes a shift register group S and a virtual register 12. The shift register group S includes N shift registers 11 arranged in cascade. The virtual register 12 is cascaded to a shift register 111 at an N-th stage. The detection signal line 20 is electrically connected to an output end of the virtual register 12.

The array substrate 100 is a key component for subsequently forming a display panel 200. The display panel 200 is an apparatus for displaying images. In addition to the array substrate 100, the display panel 200 also includes a light-emitting element F. The light-emitting element F is a main component for realizing the light-emitting function. In the embodiments of the present application, the light-emitting element F can be a micro light-emitting element F such as a micro light-emitting diode (Micro Light Emitting Diode, Micro LED) or a sub-millimeter light-emitting diode (Mini Light Emitting Diode, Mini LED). The light-emitting element F may have a variety of structural forms, for example, the light-emitting element F may be a flip chip, or a wire-bonding chip, or a vertical chip, which is not limited in the embodiments of the present application. The light-emitting element F is not shown in FIG. 1 and FIG. 2, while FIG. 3 shows the light-emitting element F and the circuit structure for driving and controlling the light-emitting element F.

The array substrate 100 includes a pixel circuit P, the pixel circuit P is a circuit structure for driving and controlling the light-emitting element F to emit light or not. The number of pixel circuits P is multiple, and multiple pixel circuits P control different light-emitting elements F to realize the light-emitting function respectively. The projections of the pixel circuit P and the corresponding light-emitting element F in a thickness direction Z of the display panel 200 may overlap with each other, or may be relatively staggered, which is not limited in the embodiments of the present application.

The pixel circuit P includes a pulse width modulation subcircuit P1 and an amplitude modulation subcircuit P2. The pulse width modulation subcircuit P1 is configured to control the pulse width of the driving current provided to the light-emitting element F based on the pulse width modulation data voltage, and the amplitude modulation subcircuit P2 is configured to control the amplitude of the driving current provided to the light-emitting element F based on the pulse amplitude modulation data voltage, wherein the pulse width of the driving current can be understood as the duration of the driving current, and the amplitude of the driving current can be understood as the current value of the driving current.

Specifically, the light-emitting element F includes a first electrode, a second electrode and a light-emitting portion. Under the joint action of the first electrode and the second electrode, the light-emitting portion can realize the light-emitting display function. The pixel circuit P generates a driving current under the control of the amplitude modulation subcircuit P2 and the pulse width modulation subcircuit P1. The amplitude modulation subcircuit P2 is used to control the amplitude of the driving current, and the pulse width modulation subcircuit P1 is used to adjust the pulse width of the voltage applied to the second electrode of the light-emitting element F. The pulse width modulation subcircuit P1 adjusts the pulse width of the voltage applied to the second electrode of the light-emitting element F, that is, the pulse width modulation subcircuit P1 adjusts the actual emission period of the driving current applied to the light-emitting element F; at the same time, the driving current applied to the light-emitting element F can be kept at a constant level to adjust the grayscale or brightness displayed by the light-emitting element F, rather than adjusting the grayscale or brightness displayed by the light-emitting element F by adjusting the magnitude of the driving current applied to the light-emitting element F. Therefore, the amplitude modulation subcircuit P2 can provide a driving current to the light-emitting element F so that the light-emitting element F is driven with the best luminous efficiency, and adjust the grayscale or brightness displayed by the light-emitting element F by adjusting the light-emitting duty cycle (that is, the emission period of the light-emitting element F) of the light-emitting element F through the pulse width modulation subcircuit P1, wherein the output end of the pulse width modulation subcircuit P1 can be directly connected to the control end of a driving transistor in the amplitude modulation subcircuit P2 or indirectly controlled by a capacitor structure, that is, the electrical signal output by the output end of the pulse width modulation subcircuit P1 can be directly written to the control end of the driving transistor, or written to the capacitor structure to control the control end of the driving transistor, so as to adjust an amplitude of the driving current.

Figure 3A:
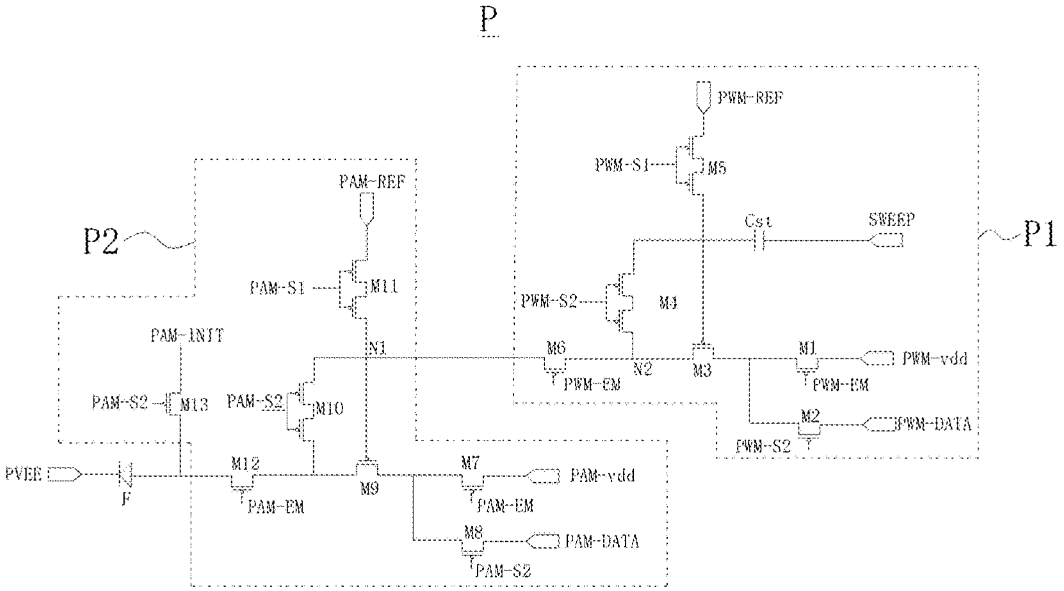
FIG. 3A and FIG. 3B are simplified schematic diagrams of circuits of two pixel circuits in an array substrate provided in an embodiment of the present application.

Further, the specific circuit compositions of the pulse width modulation subcircuit P1 and the amplitude modulation subcircuit P2 are not limited in the embodiments of the present application. Exemplarily, as shown in FIG. 3A, the pulse width modulation subcircuit P1 includes a first driving transistor M3, a first gate reset transistor M5, a first data writing transistor M2, a first compensation transistor M4, a first control transistor M1, a second control transistor M6 and a storage capacitor Cst. The first control transistor M1 is connected between the first power supply voltage PWM-vdd and the first electrode of the first driving transistor M3, and the second control transistor M6 is connected between the second electrode of the first driving transistor M3 and the first node N1. The first data writing transistor M2 is connected to the first data signal PWM-data and the first electrode of the first driving transistor M3, the first compensation transistor M4 is connected to the second electrode and the control end of the first driving transistor M3, and the first gate reset transistor M5 is connected to the control end of the first driving transistor M3. The first electrode plate of the storage capacitor Cst is connected to the control end of the first driving transistor M3, and the second electrode plate of the storage capacitor Cst is connected to the frequency sweep signal SWEEP, wherein the control end of the first gate reset transistor M5 receives the first scanning signal PWM-S1, and the control ends of the first data writing transistor M2 and the first compensation transistor M4 receive the second scanning signal PWM-S2. The control ends of the first control transistor M1 and the second control transistor M6 receive the first light-emitting control signal PWM-EM.

The amplitude modulation subcircuit P2 includes a second driving transistor M9, a second gate reset transistor M11, a second data writing transistor M8, a second compensation transistor M10, a third control transistor M7, a fourth control transistor M12, and an electrode reset transistor M13. The third control transistor M7 is connected between the second power supply voltage PAM-vdd and the first electrode of the second driving transistor M9, and the fourth control transistor M12 is connected between the second electrode of the second driving transistor M9 and the light-emitting element F. The second driving transistor M9 is configured to generate a driving current under the control of its control end voltage, that is, the voltage of the first node N1. The second data writing transistor M8 is connected to the second data signal PAM-data and the first electrode of the second driving transistor M9, the second compensation transistor M10 is connected to the second electrode and the control end of the second driving transistor M9, the second gate reset transistor M11 is connected to the control end of the second driving transistor M9, the electrode reset transistor M13 is connected to the second electrode of the light-emitting element F, the fourth control transistor M12 is also connected to the second electrode of the light-emitting element F, and the first electrode of the light-emitting element F is connected to the third power supply voltage PVEE, wherein the control end of the second gate reset transistor M11 receives the third scanning signal PAM-S1; the control ends of the second data writing transistor M8, the second compensation transistor M10 and the electrode reset transistor M13 receive the fourth scanning signal PAM-S2. The control ends of the third control transistor M7 and the fourth control transistor M12 receive the second light-emitting control signal PAM-EM.

Figure 3B:
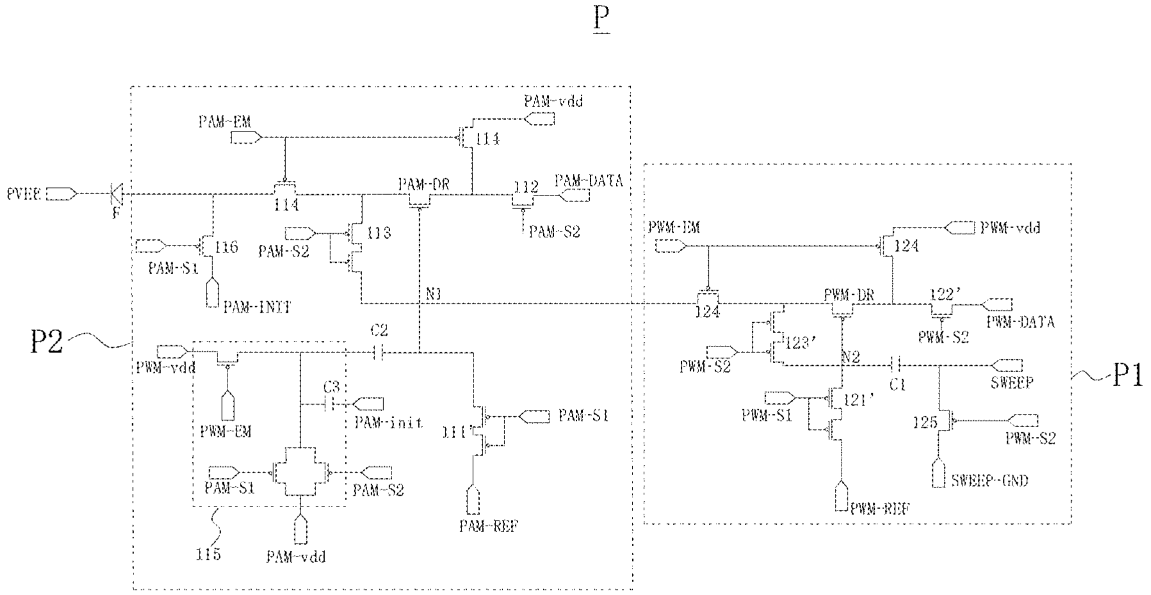

Alternatively, as shown in FIG. 3B, each of the amplitude modulation subcircuit P2 and the pulse width modulation subcircuit P1 includes an initialization unit 111'/121', a data writing unit 112/122', a threshold compensation unit 113/123', a light-emitting control unit 114/124, storage capacitors C1, C2, C3, a compensation module 115, an electrode reset module 116, a voltage stabilization module 125, and a driving transistor PAM-DR/PWM-DR. The amplitude modulation subcircuit P2 includes an initialization unit 111', a data writing unit 112, a threshold compensation unit 113, a light-emitting control unit 114, a storage capacitor C2, a voltage stabilization module 125, and a driving transistor PAM-DR; the pulse width modulation subcircuit P1 includes an initialization unit 121', a data writing unit 122', a threshold compensation unit 123', a light-emitting control unit 124, storage capacitors C2 and C3, a compensation module 115, an electrode reset module 116, and a driving transistor PWM-DR. The storage capacitor C3 is located in the compensation module 115, and the supplement module 115 also includes multiple transistor structures.

The initialization unit 111'/121' is electrically connected between the initialization signal VREF and the first node N1/N2. The initialization unit 111'/121' is used to provide the initialization signal VREF to the first node N1 and the second node N2 during the initialization stage (the initialization signal provided by the initialization signal end of the amplitude modulation subcircuit P2 may be the same as or different from the initialization signal of the pulse width modulation subcircuit P1. FIG. 3B shows the case where the initialization signal VREF includes PAM-REF and PWM-REF). The data writing unit 112/122' is electrically connected between the data signal PAM-DATA/PWM-DATA and the first electrode of the driving transistor PAM-DR/PWM-DR. The control end of the driving transistor PAM-DR/PWM-DR and the first electrode plate of the storage capacitor C2/C1 are electrically connected to the first node N1 and the second node N2. The data writing unit 112/122' is used to provide the data signal PAM-DATA/PWM-DATA to the first node N1 and the second node N2 through the driving transistor PAM-DR/PWM-DR during the data writing stage. The threshold compensation unit 113/123' is electrically connected to the second electrode of the driving transistor PAM-DR/PWM-DR. The threshold compensation unit 113/123' is used to compensate the threshold voltage of the driving transistor PAM-DR/PWM-DR to the first node N1 and the second node N2. The electrode reset module 116 is electrically connected between the second reset signal PAM-INIT and the second electrode of the light-emitting element F. The electrode reset module 116 is used to provide the second reset signal PAM-REF to the second electrode during the initialization stage to achieve the reset of the second electrode. The compensation module 115 is electrically connected to the second electrode plate of the storage capacitor C2 to play a compensation role and reduce the problem of voltage drop in the pixel circuit P. The voltage stabilization module 125 is electrically connected between the second electrode plate of the storage capacitor C1 and the voltage stabilization signal SWEEP-GND. The voltage stabilization module 125 is used to stabilize the potential of the second node N2 when the frequency sweep signal SWEEP is not working.

In addition to the pixel circuit P, the array substrate 100 also includes a gate driving circuit 10 and a detection signal line 20. The gate driving circuit 10 is a circuit structure for providing a corresponding gate control signal to the control end of the transistor in the pixel circuit P. According to different actual needs, the array substrate 100 may have multiple types of gate driving circuits 10. Exemplarily, multiple gate driving circuits 10 can be used to transmit multiple of the first scanning signal PWM-S1, the second scanning signal PWM-S2, the third scanning signal PAM-S1, the fourth scanning signal PAM-S2, the first light-emitting control signal PWM-EM, the second light-emitting control signal PAM-EM, and the frequency sweep signal line SWEEP. According to different actual needs, at least one of the first light-emitting control signal PWM-EM, the second light-emitting control signal PAM-EM, and the frequency sweep signal SWEEP can also be directly driven by directly connecting the driver chip to a specific signal trace. At this time, the multiple gate driving circuits 10 may not include a gate driving circuit 10 for transmitting at least one of the first light-emitting control signal PWM-EM, the second light-emitting control signal PAM-EM, and the frequency sweep signal SWEEP.

The gate driving circuit 10 includes a shift register group S and a virtual register 12. The shift register group S is a circuit structure composed of N shift registers 11 cascaded. The shift register 11 is a sequential logic circuit mainly used to store and transmit specific signals. The specific number of N is not limited in the embodiments of the present application, and N is a positive integer greater than 1, wherein the shift register 11 at the first stage is the shift register 11 at the first row, and the shift register 111 at the N-th stage is the shift register 11 at the last row.

The output end of the shift register 11 is electrically connected to the control end of the transistor in the pixel circuit P through a specific signal trace. Multiple pixel circuits P arranged in a specific direction can collectively form a circuit row P3. According to different actual needs, the output end of a single shift register 11 can be electrically connected only to the control ends of multiple transistors in a single circuit row P3, or the output end of a single shift register 11 can also be electrically connected to the control ends of multiple transistors in different circuit rows P3 at the same time, which is not limited in the embodiments of the present application.

The specific position relationship of the shift register 11 with respect to the pixel circuit P is not limited in the embodiments of the present application. Exemplarily, the shift register 11 can be disposed at the left and right border positions corresponding to the display panel 200, or considering that the array substrate 100 provided in the embodiments of the present application is used to form a display panel 200 with micron light-emitting diodes or sub-millimeter light-emitting diodes as light-emitting elements, the shift register 11 can be disposed between adjacent pixel circuits P, so as to facilitate the realization of a nearly borderless display effect. On this basis, the shift register 11 can be disposed between adjacent circuit rows P3, or can also be disposed between adjacent circuit columns P4.

Similar to the shift register 11, the virtual register 12 is also a register structure and is used to store and transmit specific signals. The difference is that the output end of the shift register 11 is electrically connected to the control end of the transistor in the pixel circuit P through a specific signal trace, while the output end of the virtual register 12 is not electrically connected to the control end of the transistor. In other words, the shift register 11 can provide a specific control signal to meet the operating needs of the pixel circuit P, while the virtual register 12 is not used to meet the operating needs of the pixel circuit P.

It should be noted that for a single gate driving circuit 10, there may be a shift register 11 and a virtual register 12 at the same time. On this basis, the shift register 11 and the virtual register 12 in the single gate driving circuit 10 can adopt the same circuit structure, or different circuit structures. For different gate driving circuits 10, the circuit structures corresponding to different shift registers 11 in different gate driving circuits 10 can remain the same, or can be different. Similarly, the circuit structures corresponding to different virtual registers 12 in different gate driving circuits 10 can remain the same, or can be different.

The detection signal line 20 is a signal trace for realizing the detection function of the gate driving circuit 10. Specifically, during the preparation process of the array substrate 100, a motherboard structure may be formed first. The motherboard structure includes multiple array areas arranged at intervals. Each array area includes a gate driving circuit 10 and a detection signal line 20. The detection signal line 20 is electrically connected to the gate driving circuit 10 located in the array area and the detection circuit located outside the array area. Then, the gate driving circuit 10 is detected by the detection circuit, and after the detection is completed, multiple array areas are removed to form multiple array substrates 100. In this way, in the prepared array substrate 100, there may only be a gate driving circuit 10 and a detection signal line 20, and no detection circuit may be retained, thereby reducing the space occupied by the detection circuit and facilitating a lightweight design.

In the related art, the detection signal line 20 is connected to the output end of the shift register 11 at the last row of the gate driving circuit 10. Since the detection signal line 20 itself has a certain resistance, the existence of the detection signal line 20 may increase the load difference between the shift register 11 at the last row and the shift registers 11 at other rows, so it is prone to cause display difference between the last row or several rows of light-emitting elements corresponding to the shift register 11 at the last row and light-emitting elements at other rows, that is, it is prone to cause uneven display.

In view of this, in the embodiments of the present application, a virtual register 12 is added, and the virtual register 12 is cascaded to the shift register 11 at the N-th stage, that is, the virtual register 12 is cascaded to the shift register 11 at the last row. On this basis, the detection signal line 20 is not electrically connected to the output end of the shift register 11 at the last row, but is electrically connected to the output end of the virtual register 12. In this way, the shift register 11 at the last row can be isolated from the detection signal line 20 by means of the virtual register 12, thereby reducing the load influence at the output end of the detection signal line 20 on the shift register 11 at the last row, and reducing the load difference at the output end of the shift register 11 at the last row with respect to the shift registers 11 at other rows, thereby reducing the display difference of the last row or several rows of light-emitting elements with respect to light-emitting elements at other rows, and improving the display uniformity of the display panel 200.

It should be noted that, according to different actual needs, the array substrate 100 may include a virtual pixel circuit, or may not include a virtual pixel circuit. The virtual pixel circuit has the same circuit structure as the pixel circuit P, but the difference is that the pixel circuit P can be electrically connected to the light-emitting element to meet the light-emitting display needs of the light-emitting element, while the virtual pixel circuit is not electrically connected to the light-emitting element, that is, the virtual pixel circuit is not used to meet the light-emitting display needs of the light-emitting element. Further, when the array substrate 100 includes a virtual pixel circuit, the output end of the virtual register 12 can be electrically connected to the virtual pixel circuit.

On this basis, considering that the array substrate 100 provided in the embodiments of the present application is used to form a display panel 200 with micron light-emitting diodes or sub-millimeter light-emitting diodes as light-emitting elements, and this type of display panel 200 can be designed as a borderless display panel 200, that is, the display panel 200 does not include a border area for disposing a virtual pixel circuit. In view of this, in some optional embodiments, there is only a virtual register 12 in the array substrate 100, and there is no virtual pixel circuit.

In addition, for multiple gate driving circuits 10, virtual registers 12 may be disposed in all gate driving circuits 10, or virtual registers 12 may be disposed in only some gate driving circuits 10, which is not limited in the embodiments of the present application.

In some embodiments, as shown in FIG. 1 and FIG. 2, the array substrate 100 further includes M circuit rows P3, the array substrate 100 includes multiple pixel circuits P, the circuit row P3 includes multiple pixel circuits P arranged along the first direction X, and the M circuit rows P3 are arranged in the second direction Y, and the first direction X and the second direction Y are parallel to the plane where the substrate 50 is located and intersect with each other, wherein the shift register 111 at the N-th stage provides a gate control signal to the M-th circuit row P5, wherein FIG. 1 shows a pixel circuit P in the M-th circuit row P5.

The first direction X is the row direction, and the second direction Y is the column direction. The multiple pixel circuits P arranged in the first direction X can collectively form the circuit row P3, and similarly, the multiple pixel circuits P arranged in the second direction Y can collectively form the circuit column P4. Taking the square structure of the array substrate 100 as an example, the row direction mentioned here is not limited to the width direction of the array substrate 100, and the column direction is not limited to the length direction of the array substrate 100. The first direction X and the second direction Y only represent two different arrangement directions corresponding to the multiple pixel circuits P. The first direction X and the second direction Y are both parallel to the plane where the substrate 50 is located, that is, the first direction X and the second direction Y intersect the thickness direction Z of the array substrate 100. Optionally, the first direction X, the second direction Y and the thickness direction Z of the array substrate 100 are arranged vertically in pairs.

The array substrate 100 includes a total of M circuit rows P3, and the shift register group S includes a total of N shift registers 11 arranged in cascade. The relationship between M and N is not limited in the embodiments of the present application. Exemplarily, M can be greater than N, that is, a row of shift registers 11 can drive multiple circuit rows P3 settings to achieve a one-drive-many driving mode. Or M can be equal to N, that is, a row of shift registers 11 only drives one circuit row P3 setting to achieve a one-drive-one driving mode.

In the embodiments of the present application, the shift register 111 at the N-th stage provides a gate control signal to the M-th circuit row P5, that is, the shift register 11 at the last row transmits the corresponding gate control signal to the circuit row P5 at the last row. Further, each circuit row P3 can receive the gate control signal transmitted from the shift register 11, and does not need to receive the signal output from the virtual register 12, so as to reduce the influence of the output signal of the virtual register 12 on the display effect, which is conducive to improving the display uniformity.

Figure 4:
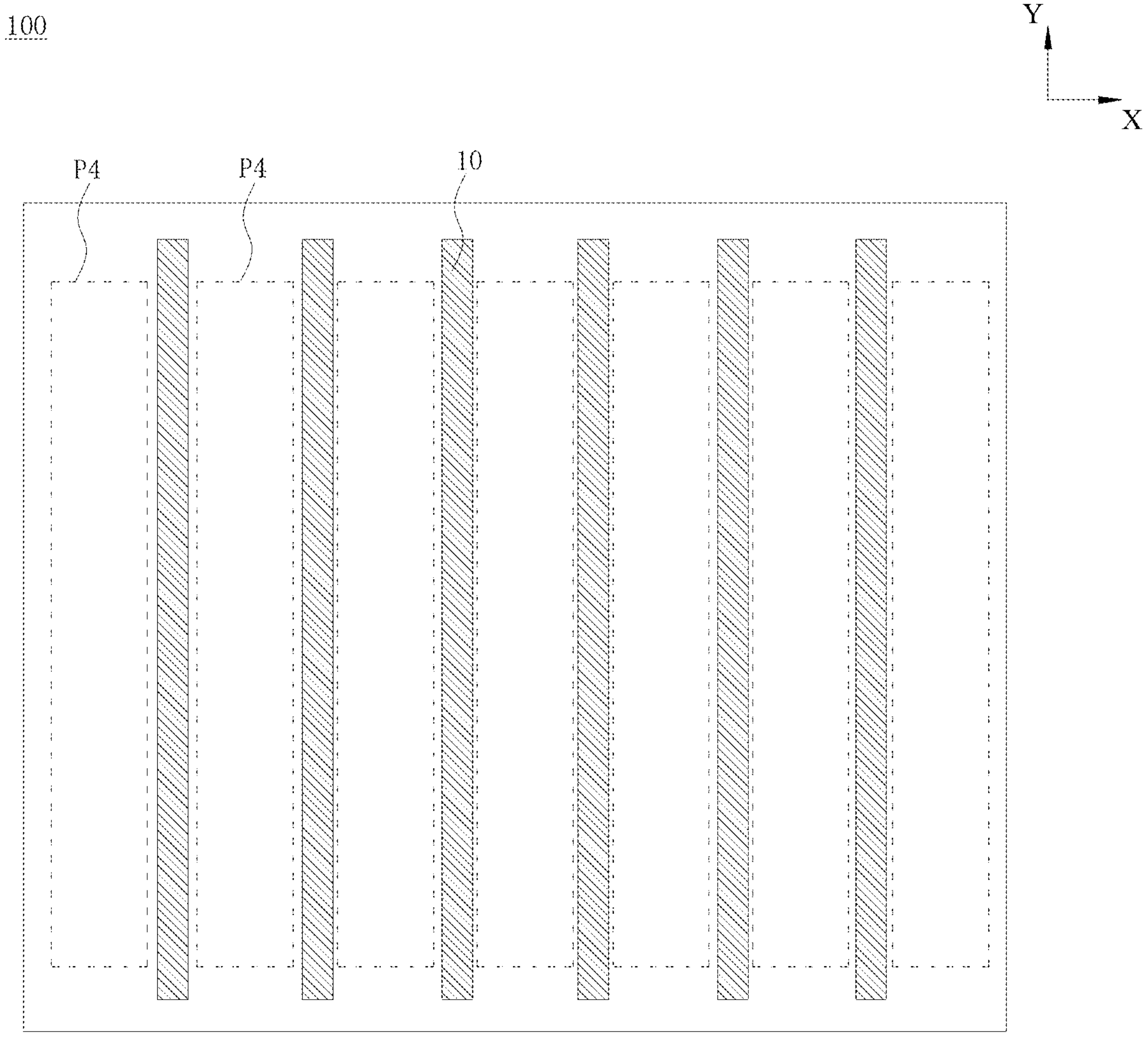
FIG. 4 is a simple structural schematic diagram of a local circuit in another array substrate provided in an embodiment of the present application.

In some embodiments, refer to FIG. 2 and FIG. 4, in the second direction Y, the shift register 11 is located between adjacent circuit rows P3; or, the array substrate 100 includes multiple circuit columns P4, and the circuit column P4 includes multiple pixel circuits P arranged along the second direction Y. In the first direction X, the shift register 11 is located between the adjacent circuit columns P4.

Taking the case where the shift register 11 is located between adjacent circuit rows P3 as an example, depending on different actual needs, only one shift register 11 or multiple shift registers 11 may be disposed between adjacent circuit rows P3, wherein the "multiple shift registers 11" mentioned here may refer to the shift registers 11 located in the same gate driving circuit 10, or may refer to the shift registers 11 located in different gate driving circuits 10. Further, for the shift registers 11 located between different circuit rows P3 in the same gate driving circuit 10, there may be only one circuit row P3 between adjacent shift registers 11, or there may be multiple circuit rows P3 at the same time, which is not limited in the embodiments of the present application, and the case where the shift register 11 is located between the adjacent circuit columns P4 is similar, wherein FIG. 2 shows the case where only one shift register 11 in a single gate driving circuit 10 is disposed between adjacent circuit rows P3, and FIG. 4 shows the case where each shift register in a single gate driving circuit 10 is disposed between the adjacent circuit columns P4.

In the embodiments of the present application, the shift register 11 is not located at the same side of all pixel circuits P, but is located between some adjacent pixel circuits P, wherein the area where the pixel circuits P are located usually corresponds to the light-emitting area of the display panel 200. It can be seen that the shift registers 11 in the embodiments of the present application are integrated in the light-emitting area of the display panel 200. This design is conducive to achieving a borderless display effect and improving the viewing experience. On this basis, the shift register 11 can be disposed between adjacent circuit rows P3, or the shift register 11 can be disposed between the adjacent circuit columns P4, so as to meet the actual layout needs of different display panels 200, with relatively strong practicality and flexibility.

The specific position relationship of the virtual register 12 with respect to the pixel circuit P is not limited in the embodiments of the present application. The virtual registers 12 can be located at the same side of all pixel circuits P, or can be located between some adjacent circuit rows P3, or can be located between the adjacent circuit columns P4, as long as the virtual register 12 can be cascaded to the shift register 11 at the last row, and the output end of the virtual registers 12 do not transmit the gate control signal to any circuit row P3.

In some embodiments, as shown in FIG. 1 and FIG. 2, in the second direction Y, the shift register 11 is located between adjacent circuit rows P3, and the M-th circuit row P5 is located between the shift register 111 at the N-th stage and the virtual register 12.

In combination with the above content, it can be seen that the array substrate 100 has a total of M circuit rows P3, and the M-th circuit row P5 is the circuit row P5 at the last row; and the shift register group S includes N shift registers 11 arranged in cascade, and the shift register 111 at the N-th stage is the shift register 11 at the last row.

On this basis, the M-th circuit row P5 is located between the shift register 111 at the N-th stage and the virtual register 12, which represents that the circuit row P5 at the last row is located between the shift register 11 at the last row and the virtual register 12, the shift register 11 at the last row are located between adjacent circuit rows P3, and the virtual register 12 is located at the same side of all circuit rows P3, wherein the shift register 11 at the last row can be located between the circuit row P5 at the last row and the circuit row P3 at the second-to-last row, or can also be located between two other adjacent circuit rows P3 except the circuit row P5 at the last row, which is not limited in the embodiments of the present application, as long as the circuit row P5 at the last row is located between the shift register 11 at the last row and the virtual register 12, and the shift register 11 at the last row is located between adjacent circuit rows P3. FIG. 1 shows the case where the shift register 11 is located between the circuit row P5 at the last row and the circuit row P3 at the second-to-last row.

In the embodiments of the present application, since the virtual register 12 is located at the same side of all circuit rows P3, the detection signal line 20 electrically connected to the output end of the virtual register 12 may also be located at the same side of all circuit rows P3. In this case, the detection signal line 20 may not overlap the pixel circuit P in the thickness direction Z of the array substrate 100, which is conducive to reducing the risk of parasitic capacitance between the detection signal line 20 and part of the conductor structure in the pixel circuit P, and improving the operation reliability of the pixel circuit P.

Figure 5:
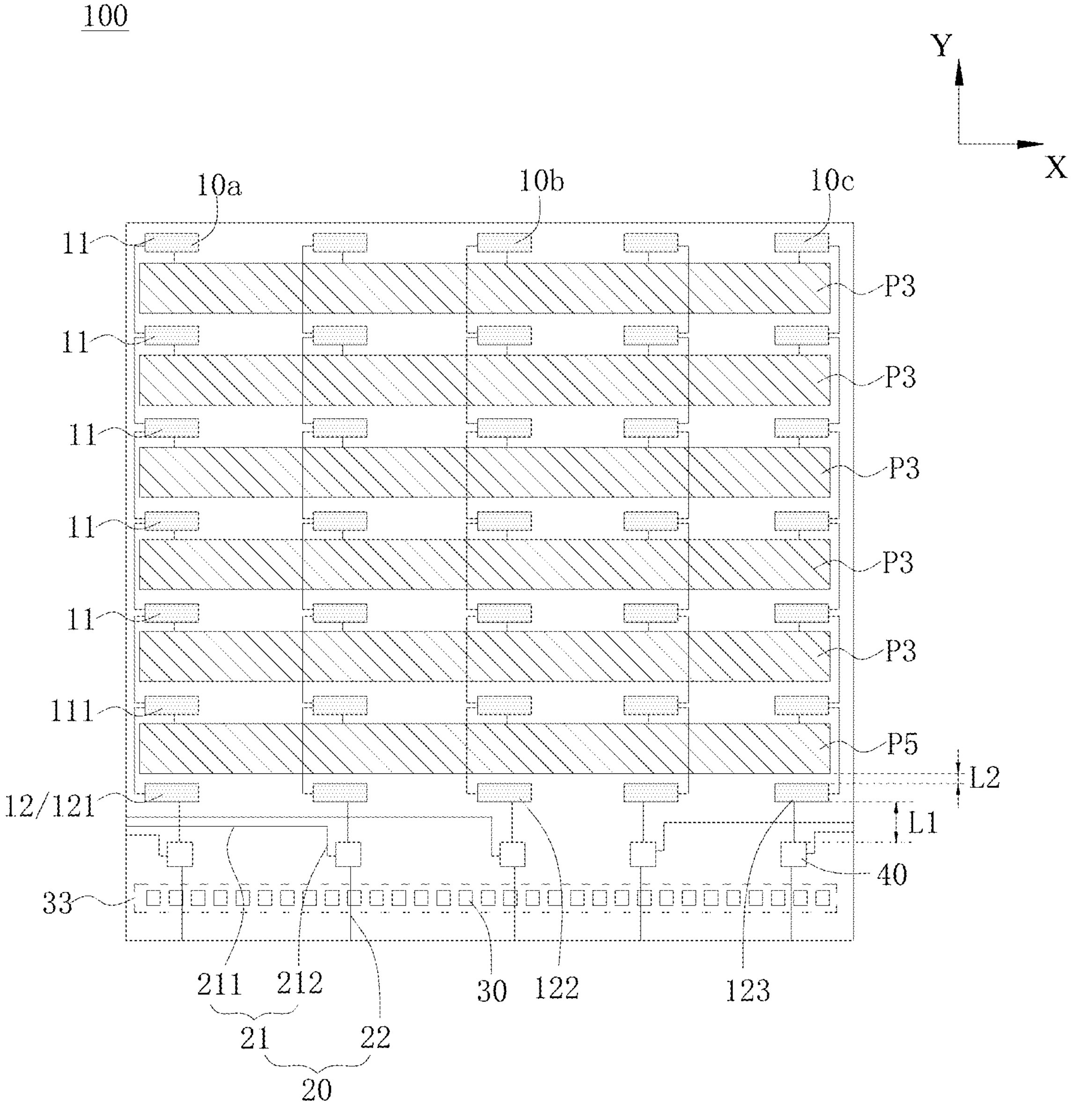
FIG. 5 is a simple structural schematic diagram of a local circuit in another array substrate provided in an embodiment of the present application.

In some embodiments, refer to FIGS. 1, 2 and 5, the array substrate 100 also includes multiple electrode structures 30, the electrode structure 30 includes an first connection electrode 31 and a second connection electrode 32 that are insulated, the second connection electrode 32 is connected to the pixel circuit P, and the multiple electrode structures 30 include a first electrode group 33 connected to the M-th circuit row P5, and in the second direction Y, the virtual register 12 is located between the first electrode group 33 and the M-th circuit row P5.

The light-emitting element includes a first electrode, a second electrode and a light-emitting portion, and under the joint action of the first electrode and the second electrode, the light-emitting portion can realize the light-emitting display function. The electrode structure 30 is a structure in the array substrate 100 for connecting and fixing with two electrodes in the light-emitting element, wherein the first connection electrode 31 is a structure in the electrode structure 30 for bonding and connecting with the first electrode, and the second connection electrode 32 is a structure in the electrode structure 30 for bonding and connecting with the second electrode.

In order to meet the control needs of the light-emitting element, the second connection electrode 32 needs to be connected to the pixel circuit P, and the first connection electrode 31 needs to transmit the second power signal PVEE, and the first connection electrode 31 and the second connection electrode 32 in the same electrode structure 30 are insulated from each other. For different electrode structures 30, each electrode structure 30 includes a first connection electrode 31 and a second connection electrode 32, and different electrode structures 30 are arranged corresponding to different light-emitting elements respectively, that is, in the thickness direction Z of the array substrate 100, the projection of the light-emitting element overlaps the projection of the corresponding electrode structure 30.

It should be noted that, in order to meet the independent control needs of different light-emitting elements, the second connection electrodes 32 in different electrode structures 30 need to be insulated and spaced from each other, while the first connection electrodes 31 in different electrode structures 30 can be connected as a whole, or can also be insulated and spaced. Optionally, at least part of the first connection electrodes 31 in different electrode structures 30 are connected as a whole.

The first electrode group 33 is a single electrode row composed of multiple electrode structures 30 arranged along the first direction X, and the second connection electrodes 32 in the multiple electrode structures 30 in the first electrode group 33 can be electrically connected to the multiple pixel circuits P in the circuit row P5 at the last row respectively, so as to achieve the control needs of the multiple light-emitting elements corresponding to the circuit row P5 at the last row. Usually, the circuit row P5 at the last row usually corresponds to the control of the light-emitting elements at the last row. Therefore, the first electrode group 33 is the electrode structure 30 at the last row, and the multiple light-emitting elements connected to the first electrode group 33 correspondingly are the light-emitting elements at the last row. FIG. 1 shows three electrode structures 30 arranged adjacent to each other in the first electrode group 33, but it does not mean that the first electrode group 33 includes only three electrode structures 30. Further, the light-emitting elements corresponding to the three electrode structures 30 in FIG. 1 can collectively form a repeating unit, and multiple repeating units are repeatedly arranged along the first direction X and the second direction Y.

In the embodiments of the present application, the projections of the first electrode group 33 and the circuit row P5 at the last row in the thickness direction Z of the array substrate 100 do not overlap, but the first electrode group 33 is located at the side of the circuit row P5 at the last row away from other circuit rows P3 along the second direction Y. On this basis, considering that the projections of the first electrode group 33 and the corresponding light-emitting elements at the last row on the array substrate 100 usually overlap, the projections of the light-emitting elements at the last row and the circuit row P5 at the last row in the thickness direction Z of the array substrate 100 also do not overlap.

In view of this, the virtual register 12 is located between the first electrode group 33 and the M-th circuit row P5 along the second direction Y, which means that the virtual register 12 may be located between the light-emitting elements at the last row and the circuit row P5 at the last row, and the circuit row P5 at the last row is located at the side of the light-emitting elements at the last row facing other light-emitting elements, so the virtual register 12 may be located between adjacent rows of light-emitting elements, rather than at the same side of all light-emitting elements. In other words, the virtual register 12 may be integrated in the light-emitting area of the display panel 200, rather than in the border area, which is conducive to eliminating the border area of the display panel 200 and achieving a borderless effect.

It should be noted that the positional relationship of light-emitting elements at different rows with respect to the virtual register 12 is not limited in the embodiments of the present application. Exemplarily, the side of the virtual register 12 away from the circuit row P5 at the last row can only be provided with the light-emitting elements at the last row, or can also be provided with light-emitting elements at the second-to-last row or even more rows of light-emitting elements. Similarly, the area between the virtual register 12 and the circuit row P5 at the last row can be provided with light-emitting elements, or can also be provided with no light-emitting elements, and the projection of the virtual register 12 in the thickness direction Z of the array substrate 100 overlaps the projections of the electrode structure 30 and the corresponding light-emitting element, or does not overlap the light-emitting element.

The positional relationship between the light-emitting elements at the last row and the detection signal line 20 is also not limited in the embodiments of the present application. The orthographic projection of the light-emitting elements at the last row on the array substrate 100 may be arranged to overlap the detection signal line 20, or may not be arranged to overlap the detection signal line 20.

In addition, although the circuit row P5 at the last row is not arranged corresponding to the position of the light-emitting elements at the last row, for circuit rows P3 at other rows and corresponding light-emitting elements at other rows, the positions between the two can overlap or not overlap, which is not limited in the embodiments of the present application. Optionally, the distance between adjacent rows of light-emitting elements in the second direction Y remains the same or similar, the distance between adjacent circuit rows P3 in the second direction Y remains the same or similar, and the distance between adjacent rows of light-emitting elements is greater than the distance between adjacent circuit rows P3, which is conducive to improving the display uniformity of the display panel 200. At the same time, the light-emitting area of the display panel 200 can cover and exceed the area where all pixel circuits P are located. In this way, outside the area where the pixel circuits P are located and in part of the light-emitting area, device structures such as virtual registers 12 or signal traces can be arranged, thereby eliminating or reducing the border area of the display panel 200 and achieving a borderless display effect.

In summary, the position of the first electrode group 33 corresponding to the circuit row P5 at the last row is adjusted in the embodiments of the present application, so that first electrode group 33 does not overlap the projection of the circuit row P5 at the last row, but is located at the side of the circuit row P5 at the last row along the second direction Y, and the virtual register 12 is located between the first electrode group 33 and the circuit row P5 at the last row. Since the position of the first electrode group 33 usually corresponds to the position of the light-emitting elements at the last row, under this design, the virtual register 12 can be located at the side of the light-emitting elements at the last row facing light-emitting elements at other rows, that is, the virtual register 12 can be located in the light-emitting area of the display panel 200, thereby eliminating or reducing the border area of the display panel 200, achieving a borderless display effect, and improving the viewing experience of the display panel 200.

In some embodiments, N=M, that is, the number of shift registers 11 cascaded in the shift register group S is equal to the number of circuit rows P3 in the array substrate 100. On this basis, each stage of shift register 11 can transmit a gate control signal to the corresponding single circuit row P3 to realize a one-to-one driving mode.

In the embodiments of the present application, considering that the array substrate 100 can be used to form a borderless display panel 200, and the borderless arrangement means that a virtual circuit row P3 including virtual pixel circuits P cannot be disposed, the shift register 11 and the circuit row P3 are disposed to a one-to-one form, so that the number of circuit rows P3 driven by the shift register 11 at the last row can be kept consistent with the number of circuit rows P3 driven by the other row of shift register 11 without adding additional virtual circuit rows P3, which is conducive to reducing the display difference between the light-emitting elements at the last row and light-emitting elements at other rows and improving display uniformity.

In some embodiments, N<M.

In the embodiments of the present application, the number of shift registers 11 cascaded in the shift register group S may also be less than the number of circuit rows P3 in the array substrate 100, so as to realize a one-drive-many driving mode, which is conducive to reducing the overall number of shift registers 11 in the array substrate 100 and reducing the layout difficulty between signal trace and device structures in the array substrate 100.

In some embodiments, the circuit structures of the virtual registers 12 in at least part of the different gate driving circuits 10 are different; and/or, the circuit structures of the virtual registers 12 in at least part of the gate driving circuits 10 remain consistent.

The "circuit structures remain consistent" mentioned here means that the number and type of device structures, such as transistors and capacitors, included in different virtual registers 12, and the connection methods between the devices can remain the same, regardless of the size and shape corresponding to different virtual registers 12. In other words, the sizes of different virtual registers 12 in the first direction X or the second direction Y can be the same, or can be different. Similarly, the "different circuit structures" mentioned here refer to: the number and type of device structures such as transistors and capacitors included in different virtual registers 12, and at least one of the connection methods between the devices are different, regardless of the size and shape corresponding to the different virtual registers 12.

According to different actual needs, the circuit structures of the virtual registers 12 in different gate driving circuits 10 can be different, or can all remain consistent. Or the circuit structures of the virtual registers 12 in some different gate driving circuits 10 are consistent, and the circuit structures of the virtual registers 12 in some different gate driving circuits 10 are different.

Combined with the above content, it can be seen that, unlike the shift register 11, the output end of the virtual register 12 is not electrically connected to the control end of the transistor in the pixel circuit P, that is, the shift register 11 is used to drive the pixel circuit P, and the virtual register 12 is not used to drive the pixel circuit P, that is, the virtual register 12 does not play the same role as the shift register 11 in outputting the gate control signal, so the circuit structure of the virtual register 12 can be flexibly adjusted or changed according to different actual needs.

On this basis, in the embodiments of the present application, the circuit structures of the virtual registers 12 in at least part of the different gate driving circuits 10 can be different, or the circuit structures of the virtual registers 12 in at least part of the gate driving circuits 10 can be consistent, so as to meet the layout needs of different situations, with relatively strong flexibility and practicality.

In some embodiments, in a single gate driving circuit 10, the circuit structure in the virtual register 12 is consistent with the circuit structure in the shift register 11.

In the embodiments of the present application, by arranging the circuit structure of the virtual register 12 in a single gate driving circuit 10 to be consistent with that of the shift register 11, it is conducive to reducing the design difficulty of the virtual register 12, and at the same time, the structural load of the virtual register 12 in a single gate driving circuit 10 can be the same as the structural load of the shift register 11. The "structural load of the virtual register 12" mentioned here refers to: the load value corresponding to the structure of the virtual register 12 itself, rather than the load value corresponding to other structures connected to the output end of the virtual register 12, and the structural load of the shift register 11 is the same.

On this basis, since in a single gate driving circuit 10, the output end of the shift register 11 at the last row is electrically connected to the virtual register 12, and the output ends of the shift registers 11 at other rows are electrically connected to the shift register 11, this design is conducive to reducing the load difference at the output end of the shift register 11 at the last row with respect to the shift registers 11 at other rows, thereby reducing the display difference of the last row or several rows of light-emitting elements with respect to the light-emitting elements at other rows, and improving the display uniformity of the display panel 200.

It should be noted that for different gate driving circuits 10, the circuit structures of the shift registers 11 contained therein can be consistent, or there can be differences. On this basis, whether the circuit structures of the corresponding virtual registers 12 in different gate driving circuits 10 are the same or not depends on whether the circuit structures of the shift registers 11 in different gate driving circuits 10 are the same, which is not limited in the embodiments of the present application.

In addition, in a single gate driving circuit 10, although the virtual register 12 has the same circuit structure as the shift register 11, the sizes of the corresponding occupied spaces of the two may be the same or different. For example, the size of the virtual register 12 in the first direction X may be greater than, less than or equal to the size of the shift register 11 in the first direction X, and the size of the virtual register 12 in the second direction Y may also be greater than, less than or equal to the size of the shift register 11 in the second direction Y.

In some embodiments, as shown in FIG. 1 and FIG. 2, in a single gate driving circuit 10, the sizes of the virtual register 12 and the shift register 11 in the first direction X are the same; and/or, in a single gate driving circuit 10, the sizes of the virtual register 12 and the shift register 11 in the second direction Y are the same.

In the embodiments of the present application, in addition to having the same circuit structure, the virtual register 12 and the shift register 11 in the single gate driving circuit 10 may also have the same size in at least one of the first direction X and the second direction Y, which is conducive to further improving the consistency of the virtual register 12 and the shift register 11 in the single gate driving circuit 10 and reducing the design difficulty of the virtual register 12.

Further optionally, in a single gate driving circuit 10, the positional relationship of the virtual register 12 with respect to the shift register 11 at the last row is the same as the positional relationship of the shift register 11 at the last row with respect to the shift register 11 at the second-to-last row, so that the multiple shift registers 11 and the virtual registers 12 in the single gate driving circuit 10 can be arranged in a consistent and unified manner, which is conducive to reducing the layout difficulty of the device structure and signal trace inside the array substrate 100.

In some embodiments, the multiple gate driving circuits 10 include a first type of gate driving circuit 10*a* and a second type of gate driving circuit 10*b*, the first type of gate driving circuit 10*a* is used to control the data signal to be written into the pixel circuit P, and the second type of gate driving circuit 10*b* is used to control the reset signal to be written into the pixel circuit P, wherein at least one of the first type of gate driving circuit 10*a* and the second type of gate driving circuit 10*b* includes a virtual register 12.

The first type of gate driving circuit 10*a* is a circuit structure for controlling the data signal to be written into the pixel circuit P, and the second type of gate driving circuit 10*b* is a circuit structure for controlling the reset signal to be written into the pixel circuit P, wherein the data signal includes a first data signal PWM-data and a second data signal PAM-data, and the reset signal includes a first reset signal PWM-REF and a second reset signal PAM-REF.

On this basis, in combination with FIG. 3A, the first type of gate driving circuit 10*a* may include two types of gate driving circuits 10, one of which is used to transmit the second scanning signal PWM-S2 to the control end of the first data writing transistor M2, and the other is used to output the fourth scanning signal PAM-S2 to the control end of the second data writing transistor M8. Similarly, the second type of gate driving circuit 10*b* may include two types of gate driving circuits 10, one of which is used to transmit the first scanning signal PWM-S1 to the control end of the first gate reset transistor M5, and the other is used to output the third scanning signal PAM-S3 to the control end of the second gate reset transistor M11.

In the embodiments of the present application, considering that the array substrate 100 includes multiple types of gate driving circuits 10, and the virtual register 12 can be disposed only in a specific type of gate driving circuit 10, or can also be disposed in all gate driving circuits 10, it can be flexibly adjusted according to the actual layout needs, with relatively strong practicality and flexibility.

Exemplarily, the first type of gate driving circuit 10*a* is used to control the data signal to be written into the pixel circuit P. The first type of gate driving circuit 10*a* is the gate driving circuit 10 that has the greatest impact on brightness. Therefore, a virtual register 12 may be disposed only in the first type of gate driving circuit 10*a* to improve the light-emitting brightness and light-emitting accuracy of the display panel 200. At the same time, the virtual register 12 may not be disposed in the second type of gate driving circuit 10*b*. In this way, other signal trace or device structures may be disposed in the area below the second type of gate driving circuit 10*b* to reduce the layout pressure of the array substrate 100.

In other embodiments, the virtual register 12 may be disposed only in the second type of gate driving circuit 10*b*, and the virtual register 12 may not be disposed in the first type of gate driving circuit 10*a*, or the virtual register 12 may be disposed in both the first type of gate driving circuit 10*a* and the second type of gate driving circuit 10*b*.

In some embodiments, the pixel circuit P includes an amplitude modulation subcircuit P2 and a pulse width modulation subcircuit P1, the first type of gate driving circuit 10*a* includes a first gate driving circuit and a second gate driving circuit, and the second type of gate driving circuit 10*b* includes a third gate driving circuit and a fourth gate driving circuit. The first gate driving circuit is used to control the first data signal PWM-data to be written into the pulse width modulation subcircuit P1, the second gate driving circuit is used to control the second data signal PAM-data to be written into the amplitude modulation subcircuit P2, the third gate driving circuit is used to control the first reset signal PWM-REF to be written into the pulse width modulation subcircuit P1, and the fourth gate driving circuit is used to control the second reset signal PAM-REF to be written into the amplitude modulation subcircuit P2.

In conjunction with FIG. 3A, the output end of the first gate driving circuit can transmit the second scanning signal PWM-S2 to the control end of the first data writing transistor M2 through a signal trace, so that the first data writing transistor M2 is in a turn-on state, thereby controlling the first data signal PWM-data to be written into the pulse width modulation subcircuit P1. The output end of the second gate driving circuit can transmit the fourth scanning signal PAM-S2 to the control end of the second data writing transistor M8 through the signal trace, so that the second data writing transistor M8 is in the turn-on state, thereby controlling the second data signal PAM-data to be written into the amplitude modulation subcircuit P2.

The output end of the third gate driving circuit can transmit the first scanning signal PWM-S1 to the control end of the first gate reset transistor M5 through the signal trace, so that the first gate reset transistor M5 is in the turn-on state, thereby controlling the first reset signal PWM-REF to be written into the pulse width modulation subcircuit P1. The output end of the fourth gate driving circuit can transmit the third scanning signal PAM-S1 to the control end of the second gate reset transistor M11 through the signal trace, so that the second gate reset transistor M11 is in the turn-on state, thereby controlling the second reset signal PAM-REF to be written into the amplitude modulation subcircuit P2.

Further, in the embodiments of the present application, a virtual register 12 can be selectively disposed in one or more of the first gate driving circuit, the second gate driving circuit, the third gate driving circuit and the fourth gate driving circuit, so as to improve the reliability of the output signal of the shift register 11 at the last row in the corresponding gate driving circuit 10, which has relatively strong practicality and flexibility.

Figure 6:
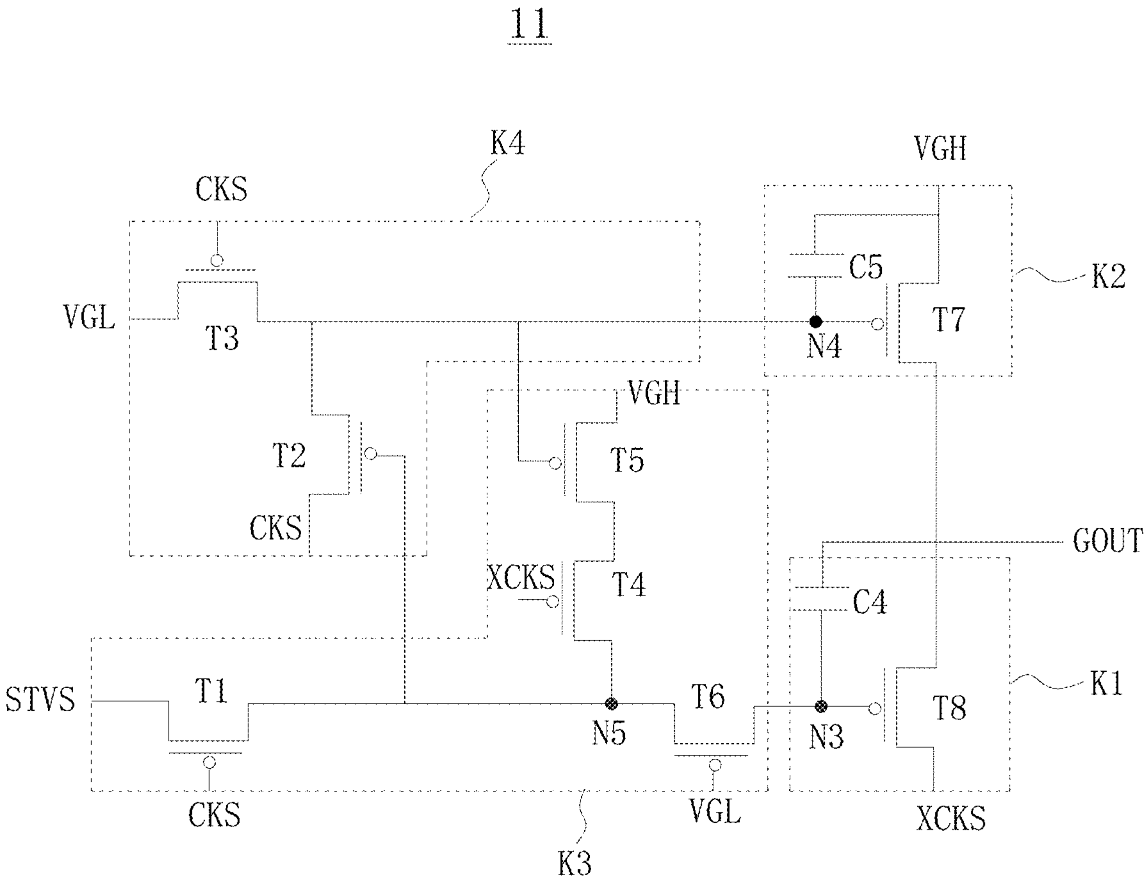
FIG. 6 is a simplified schematic diagram of a circuit of a shift register in a first gate driving circuit in an array substrate provided in an embodiment of the present application.

In some embodiments, refer to FIG. 5 and FIG. 6, the first type of gate driving circuit 10*a* includes a first virtual register 121, the second type of gate driving circuit 10*b* includes a second virtual register 122, and the circuit structure of the first virtual register 121 is consistent with that of the second virtual register 122.

The scanning signal in the pixel circuit P includes a first scanning signal PWM-S1, a second scanning signal PWM-S2, a third scanning signal PAM-S1 and a fourth scanning signal PAM-S2, and for these four types of scanning signals, the circuit structures of the shift registers 11 in the corresponding gate driving circuit 10 can be consistent, in other words, the first gate driving circuit, the second gate driving circuit, the third gate driving circuit and the fourth gate driving circuit all include a shift register 11 with the same circuit structure.

Next, the structure of the shift register 11 in the first gate driving circuit is introduced in combination with the drawings in the embodiments of the present application, and the shift registers 11 in the second gate driving circuit, the third gate driving circuit and the fourth gate driving circuit can adopt the same structure, which are not described in detail in the embodiments of the present application.

As shown in FIG. 6, the shift register 11 includes a first output module K1, a second output module K2, a first control module K3 and a second control module K4. The first output module K1 is connected between the second clock end XCKS and the shift output end GOUT, and the control end of the first output module K1 is connected to the third node N3. The potential of the third node N3 controls the on-off state of the first output module K1. The first output module K1 includes a transistor T8 and a capacitor C4, the control end of the transistor T8 is connected to the third node N3, the first electrode and the second electrode are connected to the second clock end XCKS and the shift output end GOUT respectively, and the two electrode plates of the capacitor C4 are respectively connected to the second clock end XCKS and the shift output end GOUT.

The second output module K2 is connected between the first power supply end VGH and the shift output end GOUT, and the control end of the second output module K2 is connected to the fourth node N4. The potential of the fourth node N4 controls the on-off state of the second output module K2. The second output module K1 includes a transistor T7 and a capacitor C5, the control end of the transistor T7 is connected to the fourth node N4, the first electrode and the second electrode are connected to the first power supply end VGH and the shift output end GOUT respectively, and the two electrode plates of the capacitor C5 are connected to the first power supply end VGH and the shift output end GOUT respectively.

The first control module K3 is connected to the third node N3, which is used to control the on-off state of the first output module K1. The first control module K3 includes a transistor T1, a transistor T4, a transistor T5 and a transistor T6. The control end of the transistor T1 is connected to the first clock end CKS, and the first electrode and the second electrode are connected to the input end STVS and the fifth node N5 respectively. The control end of the transistor T4 is connected to the second clock end XCKS, and the first electrode and the second electrode are connected to the fifth node N5 and the transistor T5 respectively. The control end of transistor T5 is connected to the fourth node N4, and the first electrode and the second electrode are connected to transistor T4 and the first power supply end VGH respectively. The control end of transistor T6 is connected to the second power supply end VGL, and the first electrode and the second electrode are connected to the fifth node N5 and the third node N3 respectively. The first power supply end VGH is a low voltage end, the second power supply end VGL is a high voltage end, and the input end STVS is connected to the output end GOUT of the shift register 11 at a front stage.

The second control module K4 is connected to the fourth node N4, which is used to control the on-off state of the second output module K2. The second control module K4 includes transistors T2 and transistors T3, the control end of transistor T2 is connected to the fifth node N5, and the first electrode and the second electrode are connected to the first clock end CKS and the fourth node N4 respectively. The control end of transistor T3 is connected to the first clock end CKS, and the first electrode and the second electrode are connected to the second power supply end VGL and the fourth node N4 respectively.

It should be noted that the above content is only a structural form of the shift register 11 in the first gate driving circuit, and it does not constitute a limitation on the circuit structure of the shift register 11. According to different actual needs, the shift register 11 can also adopt other circuit structures. Exemplarily, in other embodiments, the shift register 11 also includes a first output module K1, a second output module K2, a first control module K3 and a second control module K4, but the first output module K1 is no longer connected to the second clock end XCKS, but is connected to the second power supply end VGL. The corresponding circuit structures of the first control module K3 and the second control module K4 also need to be adjusted at this time, which is not limited in the embodiments of the present application.

On this basis, considering that in a single gate driving circuit 10, the circuit structures of the shift register 11 and the virtual register 12 can be consistent, when the first type of gate driving circuit 10*a* includes a first virtual register 121, the circuit structure of the first virtual register 121 can be consistent with the circuit structure of the shift register 11 in the first type of gate driving circuit 10*a*. When the second type of gate driving circuit 10*b* includes a second virtual register 122, the circuit structure of the second virtual register 122 can be consistent with the circuit structure of the shift register 11 in the second type of gate driving circuit 10*b*.

Further, since the circuit structures of the shift register 11 in the first type of gate driving circuit 10*a* and the shift register 11 in the second type of gate driving circuit 10*b* can be consistent, it is also possible to choose to arrange the circuit structures of the first virtual register 121 and the second virtual register 122 to be consistent, which is conducive to further reducing the design difficulty of the virtual register 12 and improving the layout reliability of the internal structure of the array substrate 100.

It should be noted that, for the first type of gate driving circuit 10*a*, the first virtual register 121 may be disposed only in the first gate driving circuit, or the first virtual register 121 may be disposed only in the second gate driving circuit, or the first virtual registers 121 may be disposed in both the first gate driving circuit and the second gate driving circuit. Similarly, for the second type of gate driving circuit 10*b*, the second virtual register 122 may be disposed only in the third gate driving circuit, or the second virtual register 122 may be disposed only in the fourth gate driving circuit, or the second virtual registers 122 may be disposed in both the third gate driving circuit and the fourth gate driving circuit.

Figure 7:
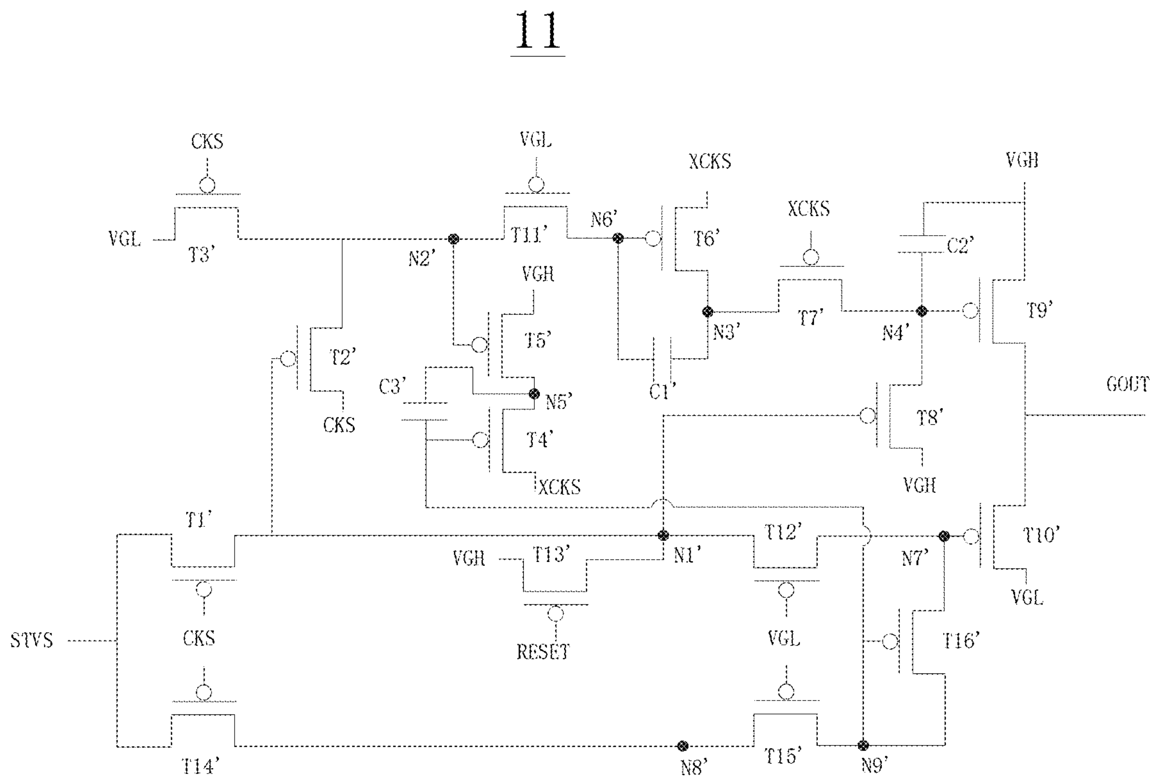
FIG. 7 is a simplified schematic diagram of a circuit of a shift register in a fifth gate driving circuit in an array substrate provided in an embodiment of the present application.

In some embodiments, refer to FIGS. 5 to 7, the multiple gate driving circuits 10 further include a third type of gate driving circuit 10*c*, which is used to output a light-emitting control signal or a frequency sweep signal SWEEP, the first type of gate driving circuit 10*a* includes a first virtual register 121, and the third type of gate driving circuit 10*c* includes a third virtual register 123. The circuit structures of the first virtual register 121 and the third virtual register 123 are different.

In conjunction with FIG. 3A, the light-emitting signal includes a first light-emitting control signal PWM-EM and a second light-emitting control signal PAM-EM, and the third type of gate driving circuit 10*c* may include at least one of a fifth gate driving circuit, a sixth gate driving circuit and a seventh gate driving circuit, wherein the fifth gate driving circuit is used to transmit the first light-emitting control signal PWM-EM to the control ends of the first control transistor M1 and the second control transistor M6, the sixth gate driving circuit is used to transmit the second light-emitting control signal PAM-EM to the control ends of the third control transistor M7 and the fourth control transistor M12, and the seventh gate driving circuit is used to transmit the frequency sweep signal SWEEP to the second electrode plate of the storage capacitor Cst.

It should be noted that, according to different actual needs, the third type of gate driving circuit 10*c* may include the fifth gate driving circuit, the sixth gate driving circuit and the seventh gate driving circuit at the same time, or one or two gate driving circuits 10 may be eliminated. Exemplarily, the third type of gate driving circuit 10*c* includes the fifth gate driving circuit and the sixth gate driving circuit, but does not include the seventh gate driving circuit, and at this time the frequency sweep signal SWEEP can be directly driven and transmitted in the form of directly connecting the driver chip through the signal trace.

For the convenience of description, the embodiment of the present application will be described by taking the third type of gate driving circuit 10*c* including the fifth gate driving circuit as an example. As shown in FIG. 7, in the fifth gate driving circuit, the control end of transistor T1' is connected to the first clock end CKS, the first electrode of the transistor T1' is connected to the frame starting signal line STV, and the second electrode of transistor T1' is connected to the node N1'. The control end of transistor T2' is connected to the node N1', the first electrode of transistor T2' is connected to the first clock end CKS, and the second electrode of transistor T2' is connected to the node N2'. The control end of transistor T3' is connected to the first clock end CKS, the first electrode of transistor T3' is connected to the second power supply end VGL, and the second electrode of transistor T3' is connected to the node N2'. The control end of transistor T4' is connected to node N9', the first electrode of transistor T4' is connected to the second clock end XCKS, and the second electrode of transistor T4' is connected to node N5'. The control end of transistor T5' is connected to node N2', the first electrode of transistor T5' is connected to the first power supply end VGH, and the second electrode of transistor T5' is connected to node N5'.

The control end of the sixth transistor T6' is connected to node N6', the first electrode of transistor T6' is connected to the second clock end XCKS, and the second electrode of transistor T6' is connected to node N3'. The control end of transistor T7' is connected to the second clock end XCKS, the first electrode of transistor T7' is connected to node N3', and the second electrode of transistor T7' is connected to node N4'. The control end of transistor T8' is connected to node N1, the first electrode of transistor T8' is connected to the first power supply end VGH, and the second electrode of transistor T8' is connected to node N4'. The control end of transistor T9' is connected to node N4', the first electrode of transistor T9' is connected to the first power supply end VGH, and the second electrode of transistor T9' is connected to the shift output end GOUT. The control end of transistor T10' is connected to node N7', the first electrode of transistor T10' is connected to the second power supply end VGL, and the second electrode of transistor T10' is connected to the shift output end GOUT.

The control end of transistor T11' is connected to the second power supply end VGL, the first electrode of transistor T11' is connected to node N2', and the second electrode of transistor T11' is connected to node N6'. The control end of transistor T12' is connected to the second power supply end VGL, the first electrode of transistor T12' is connected to node N1', and the second electrode of transistor T12' is connected to node N7. The control end of transistor T13' is connected to the reset end RESET, the first electrode of transistor T13' is connected to the first power supply end VGH, and the second electrode of transistor T13' is connected to node N1'. The control end of transistor T14' is connected to the first clock end CKS, the first electrode of transistor T14' is connected to the frame starting signal line STV, and the second electrode of transistor T14' is connected to node N8'. The control end of transistor T15' is connected to the second power supply end VGL, the first electrode of transistor T15' is connected to node N8', and the second electrode of transistor T15' is connected to node N9'. The control end of transistor T16' is connected to node N9'. The first electrode of transistor T16' is connected to node N7', and the second electrode of transistor T16' is connected to node N9'.

The first electrode plate of capacitor C1' is connected to node N6', and the second electrode plate is connected to node N3'. The first electrode plate of capacitor C2' is connected to node N4', and the second electrode plate is connected to the first power supply end VGH. The first electrode plate of capacitor C3' is connected to node N5', and the second electrode plate is connected to node N9'.

It should be noted that the above content is only a structural form of the shift register 11 in the fifth gate driving circuit, which does not constitute a limitation on the circuit structure of the shift register 11. According to different actual needs, the shift register 11 can also adopt other circuit structures. And by comparing FIG. 6 and FIG. 7, it can be seen that in the array substrate 100, the circuit structure of the shift register 11 located in the first type of gate driving circuit 10*a* is usually designed differently from the circuit structure of the shift register 11 located in the third type of gate driving circuit 10*c*.

On this basis, in the embodiments of the present application, the first virtual register 121 corresponding to the first type of gate driving circuit 10*a* is arranged to be different from the second virtual register 122 corresponding to the third type of gate driving circuit 10*c*, so that the circuit structure of the first virtual register 121 can be consistent with that of the cascaded shift register 11, and the circuit structure of the second virtual register 122 can be consistent with that of the cascaded shift register 11, so as to further improve the structural matching of the virtual register 12 and the shift register 11 in a single gate driving circuit 10, which is conducive to reducing the design and preparation difficulty of the array substrate 100.

In some embodiments, as shown in FIG. 5, the array substrate 100 also includes an electrostatic shielding unit 40, and the output end of the virtual register 12 is electrically connected to the detection signal line 20 through the electrostatic shielding unit 40.

The electrostatic shielding unit 40 is a circuit structure used to reduce electrostatic damage to the gate driving circuit 10. During the use of the display panel 200, the electrostatic shielding unit 40 can detect the voltage peak received from the gate driving circuit 10 and start quickly when a high voltage is detected to limit the voltage to a safe range, thereby reducing the damage to the gate driving circuit 10 caused by electrostatic discharge. This protection mechanism improves the operating reliability of the display panel 200 when it is subjected to electrostatic shock.

Figure 8:
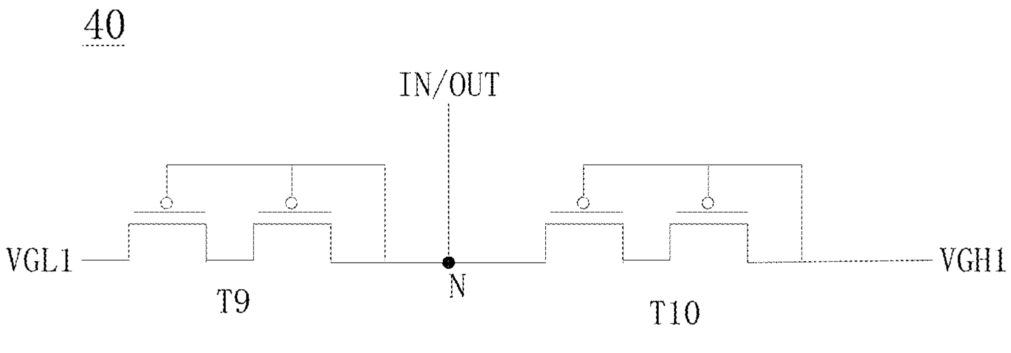
FIG. 8 is a simplified schematic diagram of a circuit of an electrostatic shielding unit in an array substrate provided in an embodiment of the present application.

Next, the specific structural composition of the electrostatic shielding unit 40 is described in combination with the drawings in the embodiments of the present application. Refer to FIG. 8, the electrostatic shielding unit 40 includes a transistor T9 and a transistor T10. The first electrode of the transistor T9 is connected to the low voltage signal VGL1, and the control end and the second electrode of the transistor T9 are connected to the node N. The control end and the first electrode of the transistor T10 are connected to the high voltage signal VGH1, and the second electrode of the transistor T10 is connected to the node N. In addition, the input end IN and the output end OUT of the electrostatic shielding unit 40 each are connected to the node N. Further, in combination with the virtual register 12 and the detection signal line 20, the input end IN of the electrostatic shielding unit 40 is also connected to the output end of the virtual register 12 through a signal trace, and the output end OUT of the electrostatic shielding unit 40 is also connected to the detection signal line 20.

It should be noted that the number of transistors T9 and transistors T10 is not limited to two. According to different actual needs, the number of transistors T9 and transistors T10 can be more. The above content is only a circuit form in the electrostatic shielding unit 40. Different electrostatic shielding units 40 that are actually needed can also adopt other circuit forms. In addition, in the finally formed display panel 200, there may only be an electrostatic shielding unit 40 corresponding to the gate driving circuit 10, or there may also be an electrostatic shielding structure corresponding to other circuits or conductor structures, for example, there may also be an electrostatic shielding structure corresponding to the touch lead, which is not limited in the embodiments of the present application.

In the embodiments of the present application, the electrostatic shielding unit 40 is not directly electrically connected to the output end of the shift register 11, but is first electrically connected to the output end of the virtual register 12, so that the virtual register 12 can also play a role in separating the electrostatic shielding unit 40 from the shift register 11, thereby reducing the influence of the electrostatic shielding unit 40 on the load size at the output end of the shift register 11 at the last row, reducing the load difference at the output end of the shift register 11 at the last row with respect to shift registers 11 at other rows, and improving the display uniformity of the display panel 200. At the same time, the output end of the virtual register 12 needs to be electrically connected to the detection signal line 20 through the electrostatic shielding unit 40 first, thereby reducing the adverse effects of external static electricity on the shift register 11 and improving the operating reliability of the gate driving circuit 10.

In some embodiments, as shown in FIG. 5, the detection signal line 20 includes a first trace 21, and the first trace 21 includes a first sub-portion 211 extending along the first direction X and a connecting portion 212 connecting the first sub-portion 211 and the electrostatic shielding unit 40. In the second direction Y, the first sub-portion 211 is located between the electrostatic shielding unit 40 and the virtual register 12.

The detection signal line 20 includes at least a first trace 21, and the first sub-portion 211 is a trace structure in the first trace 21 extending along the first direction X, i.e., along the row direction, in the motherboard structure, the first sub-portion 211 can be led out of the corresponding array area, i.e., extended to the outside of the array substrate 100 to meet the detection needs of the relevant signals.

The connecting portion 212 is a connecting structure for connecting the first sub-portion 211 and the electrostatic shielding unit 40. The connecting portion 212 has a variety of film layer composition methods and trace forms, as long as the connecting portion 212 can connect the first sub-portion 211 and the electrostatic shielding unit 40 and does not contact and interfere with other device structures and signal traces.

Optionally, the connecting portion 212 includes a first sub-portion extending along the second direction Y and a second sub-portion extending along the first direction X, both ends of the first sub-portion in the second direction Y connect the first sub-portion 211 and the second sub-portion respectively, and both ends of the second sub-portion in the first direction X connect the first sub-portion and the electrostatic shielding unit 40 respectively. Further, the first sub-portion and the second sub-portion are located in the same film layer and include the same conductive material.

As for the connecting portion 212 and the first sub-portion 211, the first sub-portion 211 and the connecting portion 212 can be located in different film layers. Optionally, the first sub-portion 211 can be located in the same film layer as the control end of the transistor in the pixel circuit P, and the connecting portion 212 can be located in the same film layer as the signal trace for transmitting data signals.

In addition, in the embodiments of the present application, in the second direction Y, the first sub-portion 211 is disposed between the electrostatic shielding unit 40 and the virtual register 12, that is, the first sub-portion 211 is located at the side of the virtual register 12 away from the shift register 11, so that the existence of the virtual register 12 can not only isolate the first sub-portion 211 from the shift register 11 at the last row at the electrical connection level, but also increase the distance between the first sub-portion 211 and the shift register 11 at the last row in the second direction Y at the physical level, reduce the risk of parasitic capacitance between the two, which is conducive to further improving the operation reliability of the gate driving circuit 10.

It should be noted that since the first sub-portion 211 and the electrostatic shielding unit 40 are both located at the side of the virtual register 12 away from the shift register 11, the connecting section 212 for connecting the first sub-portion 211 and the electrostatic shielding unit 40 is also located at the side of the virtual register 12 away from the shift register 11, so the distance between the connecting section 212 and the shift register 11 at the last row in the second direction Y can also be further increased in the embodiments of the present application, thereby reducing the risk of parasitic capacitance between the two.

In some embodiments, as shown in FIG. 5, the detection signal line 20 further includes a second trace 22, the second trace 22 connects at least one of the electrostatic shielding unit 40 and the first line 21, and at least part of the structure in the second trace 22 extends in the second direction Y away from the gate driving circuit 10.

Both the first trace 21 and the second trace 22 are partial structures of the detection signal line 20, the difference is that the first trace 21 includes a first sub-portion 211 extending in the first direction X, so that in the detection stage, the first trace 21 can be led out of the array substrate 100 along the first direction X, while at least part of the structure of the second trace 22 extends in the second direction Y away from the gate driving circuit 10, so that in the detection stage, the second trace 22 can be led out of the array substrate 100 along the second direction Y. In other words, in the detection, the first trace 21 and the second trace 22 need to be led out from different edge positions of the array substrate 100 to the outside to meet the respective needs of different detections.

The second trace 22 connects at least one of the electrostatic shielding unit 40 and the first trace 21, that is, the second trace 22 can be directly connected to the electrostatic shielding unit 40, or can also be connected to the first trace 21. Optionally, the second trace 22 is connected to the connecting portion 212. Further optionally, the second trace 22 can be an integral structure with the connecting portion 212, that is, the two are located in the same film layer and include the same conductive material, and are prepared in the same process.

Depending on different internal layouts of the array substrate 100, the second trace 22 can extend completely along the second direction Y, or the second trace 22 can also have a partial structure extending along the first direction X, so as to achieve the avoidance needs of some device structures or signal traces, which is not limited in the embodiments of the present application, as long as the general extension trend of the second trace 22 is used to extend along the second direction Y.

In the embodiments of the present application, the detection signal line 20 includes a first trace 21 partially extending along the first direction X, and a second trace 22 at least partially extending along the second direction Y. The combination of the two makes the detection signal line 20 itself have a relatively large load. On this basis, by adding a virtual register 12, the virtual register 12 can be used to block the adverse effect of the load of the detection signal line 20 itself on the shift register 11, reduce the load difference at the output end of the shift register 11 at the last row with respect to the shift registers 11 at other rows, and improve the display uniformity of the display panel 200.

In some embodiments, as shown in FIG. 1 and FIG. 5, the array substrate 100 also includes multiple electrode structures 30, the electrode structure 30 includes a first connection electrode 31 and a second connection electrode 32 that are insulated, and the second connection electrode 32 is connected to the pixel circuit P. The multiple electrode structures 30 include a first electrode group 33 connected to the M-th circuit row P5, and in the second direction Y, the electrostatic shielding unit 40 is located between the first electrode group 33 and the virtual register 12.

Combined with the above content, it can be known that the M-th circuit row P5 is the circuit row P5 at the last row, and the circuit row P5 at the last row usually corresponds to controlling the light-emitting elements at the last row. Therefore, the first electrode group 33 is the electrode structure 30 at the last row, and the multiple light-emitting elements correspondingly connected to the first electrode group 33 are the light-emitting elements at the last row, and the projections of the first electrode group 33 and the corresponding light-emitting elements at the last row on the array substrate 100 usually overlap.

In the embodiments of the present application, the electrostatic shielding unit 40 is located between the first electrode group 33 and the virtual register 12, which means that the electrostatic shielding unit 40 is located at the side of the light-emitting elements at the last row facing light-emitting elements at other rows, rather than at the same side of all rows of light-emitting elements. In other words, the electrostatic shielding unit 40 may be integrated in the light-emitting area of the display panel 200, rather than in the border area, which is conducive to eliminating the border area of the display panel 200 and achieving a borderless effect.

In some embodiments, in the second direction Y, the virtual register 12 is located between the M-th circuit row P5 and the electrostatic shielding unit 40, and the distance L1 between the virtual register 12 and the electrostatic shielding unit 40 is greater than the distance L2 between the virtual register 12 and the M-th circuit row P5.

The M-th circuit row P5 is the circuit row P5 at the last row, and its corresponding shift register 11 is the shift register 11 at the last row, and the shift register 11 at the last row may be located at the side of the circuit row P5 at the last row facing circuit rows P3 at other rows. At the same time, since the virtual register 12 is located between the circuit row P5 at the last row and the electrostatic shielding unit 40, the virtual register 12 and the shift register 11 at the last row may be disposed at both sides of the circuit row P5 at the last row in the second direction Y respectively.

On this basis, the distance L2 of the virtual register 12 with respect to the circuit row P5 at the last row in the second direction Y is limited in the embodiments of the present application, so that the distance L2 is smaller than the distance L1 between the virtual register 12 and the electrostatic shielding unit 40 in the second direction Y. In other words, compared with the electrostatic shielding unit 40, the virtual register 12 is disposed closer to the circuit row P5 at the last row in the second direction Y, which is conducive to reducing the distance between the virtual register 12 and the shift register 11 at the last row in the second direction Y, thereby reducing the length of the cascade trace for connecting the virtual register 12 and the shift register 11 at the last row, reducing the load problem caused by the excessive extension size of the cascade trace, reducing the load difference at the output end of the shift register 11 at the last row with respect to shift registers 11 at other rows, and improving the display uniformity of the display panel 200.

Figure 9:
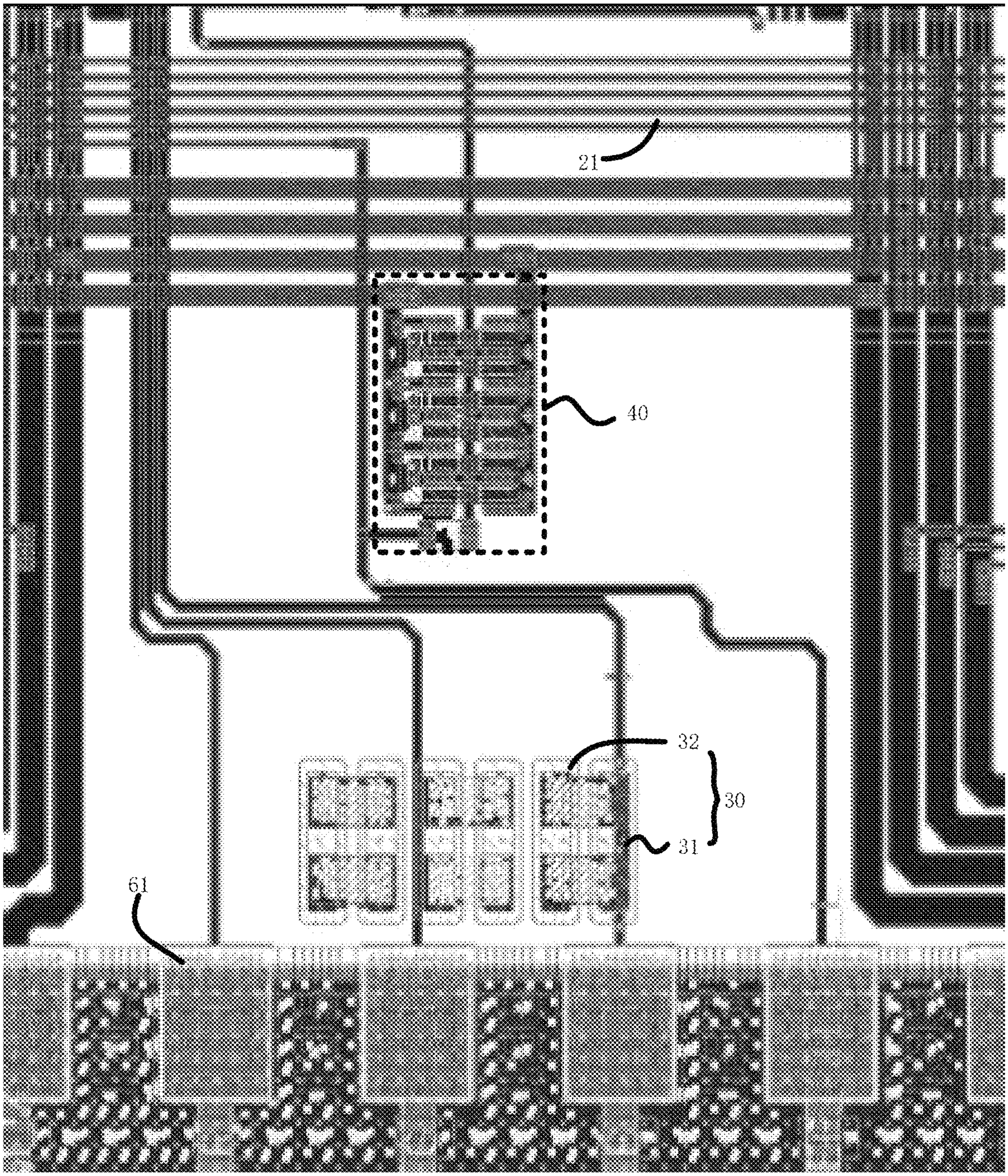
FIG. 9 is a structural schematic diagram of a local circuit in another array substrate provided in an embodiment of the present application.
Figure 10:
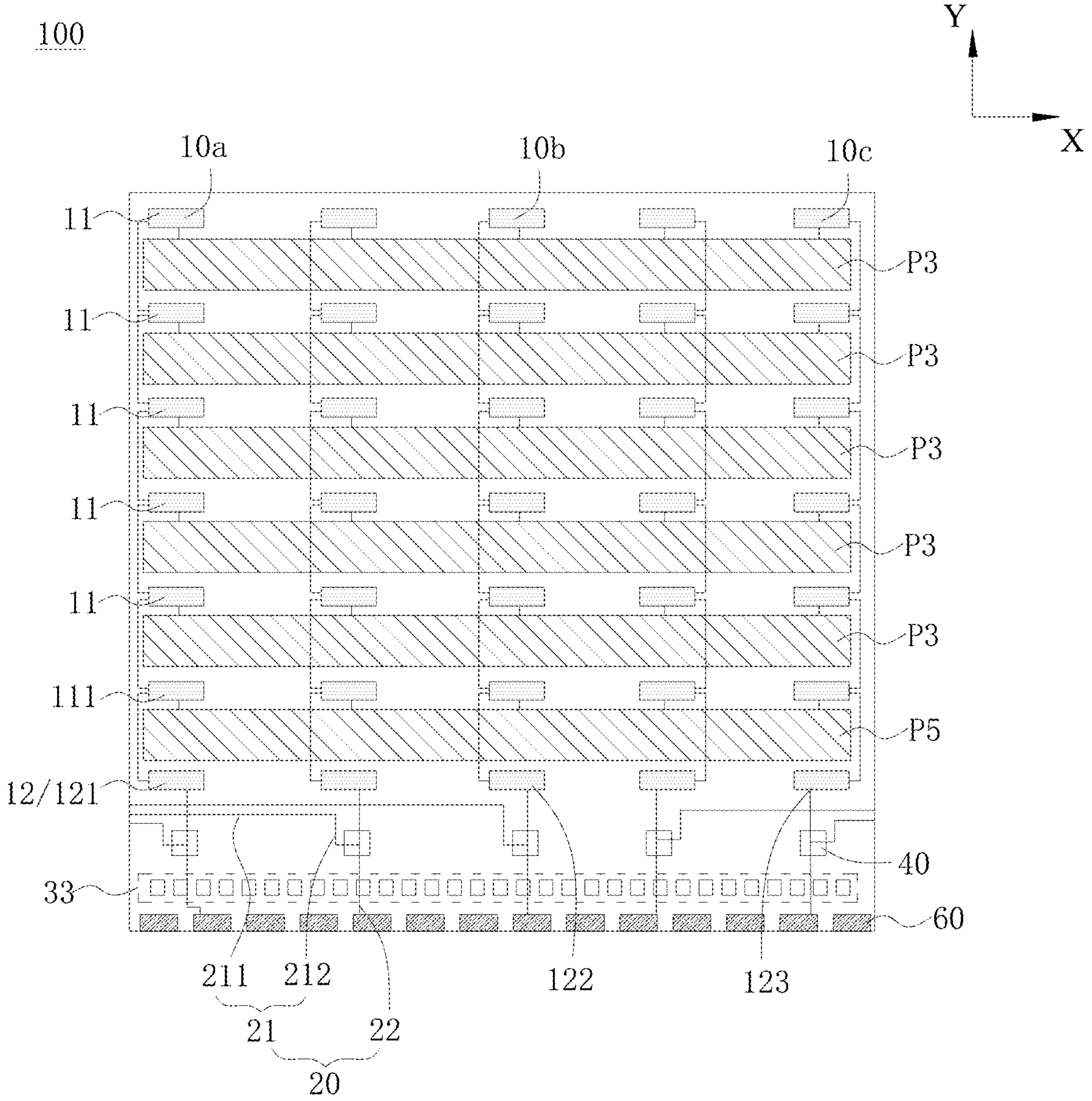
FIG. 10 is a structural schematic diagram of a local circuit in an array substrate provided in an embodiment of the present application.

In some embodiments, refer to FIGS. 9 to 11, the array substrate 100 also includes a substrate 50, multiple electrode structures 30 and multiple bonding pad structures 60, the electrode structure 30 includes a first connection electrode 31 and a second connection electrode 32 that are insulated, and the second connection electrode 32 is connected to the pixel circuit P. The bonding pad structure 60 includes a first bonding pad 61, and the first bonding pad 61 and the electrode structure 30 are located at the same side of the substrate 50.

Optionally, the bonding pad structure 60 may also include a second bonding pad 62, and the second bonding pad 62 is located at the side of the substrate 50 away from the first bonding pad 61.

The multiple electrode structures 30 include a first electrode group 33 connected to the M-th circuit row P5, and in the second direction Y, the first electrode group 33 is located between the first bonding pad 61 and the electrostatic shielding unit 40, and the distance between the first electrode group 33 and the electrostatic shielding unit 40 is greater than the distance between the first electrode group 33 and the first bonding pad 61.

The substrate 50 is a film layer structure on the array substrate 100 that plays a supporting and bearing role. The thickness direction Z of the substrate 50 is usually parallel to the thickness direction Z of the array substrate 100 itself, and in the thickness direction Z of the substrate 50, the substrate 50 includes two opposite surfaces, the light-emitting element, the electrode structure 30 and the first bonding pad 61 are all located at the side of the surface of the substrate 50, and the second bonding pad 62 and the driver chip are both located at the side of the other surface of the substrate 50.

The bonding pad structure 60 is a bridge for realizing the electrical connection between different device structures or signal traces located at both sides of the substrate 50. Exemplarily, the driver chip realizes the electrical connection with the data signal line through the bonding pad structure 60.

Figure 11A:
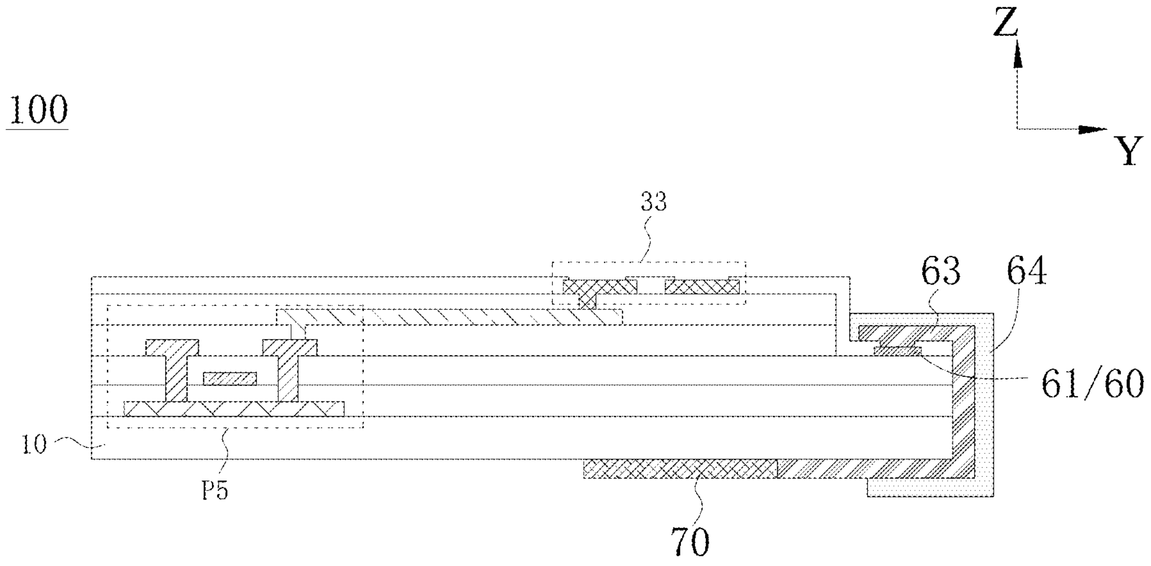
FIG. 11A and FIG. 11B are schematic diagrams of partial cross-sectional structures of two array substrates provided in an embodiment of the present application.

Depending on the different actual needs, the bonding pad structure 60 can have different forms. Specifically, as shown in FIG. 11A, the bonding pad structure 60 includes a first bonding pad 61 disposed at the side of the substrate 50. The substrate 50 is provided with a side trace 63 and a package protection portion 64 at the side of the second direction Y. The side trace 63 is connected to the first bonding pad 61 and bent to the side of the substrate away from the first bonding pad 61. The package protection portion 64 is attached to the surface of the side trace 63 to play a protective role. The partial structure of the side trace 63 located at the side of the substrate away from the first bonding pad 61 is disposed beyond the package protection portion 64 in the second direction Y and is connected to the circuit board structure 70.

Figure 11B:
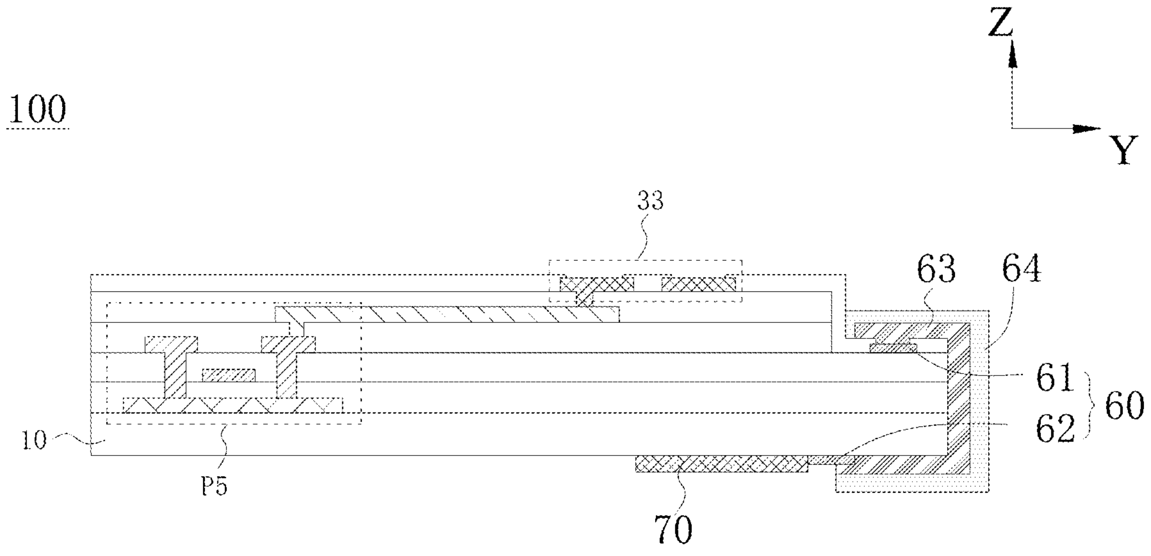

Alternatively, as shown in FIG. 11B, the bonding pad structure 60 includes a first bonding pad 61 and a second bonding pad 62 disposed at both sides of the substrate 50. There are multiple first bonding pads 61 and multiple second bonding pads 62, which are arranged side by side along the first direction X. The multiple first bonding pads 61 and the multiple second bonding pads 62 can be arranged corresponding to each other, and each of the second bonding pads 62 may be connected to the circuit board structure 70. A side trace 63 and a package protection portion 64 are provided at one side of the substrate 50 in the second direction Y. The side trace 63 is connected to the first bonding pad 61 and the second bonding pad 62 at the same time to meet the electrical connection requirements between the first bonding pad 61 and the second bonding pad 62, and the package protection portion 64 covers the side trace 63 for protecting the side trace 63.

For the first bonding pad 61, the first bonding pad 61 is usually disposed adjacent to the surface of the array substrate 100 in the second direction Y, and is located at the side of the light-emitting elements at the last row away from the light-emitting elements at other rows. Combining the above contents, it can be known that the position of the light-emitting elements at the last row in the thickness direction Z of the array substrate 100 usually overlaps the position of the first electrode group 33 in the thickness direction Z of the array substrate 100.

On this basis, in the embodiments of the present application, the distance between the first electrode group 33 and the first bonding pad 61 in the second direction Y is set to be smaller than the distance between the first electrode group 33 and the electrostatic shielding unit 40, so that the light-emitting elements at the last row is closer to the first bonding pad 61 with respect to the electrostatic shielding unit 40. In this way, during the operation of the display panel 200, the light-emitting area corresponding to the light-emitting elements at the last row can cover the area where the first bonding pad 61 is located, and even cover the edge of the array substrate 100 in the second direction Y, so as to achieve a borderless display effect and improve the viewing experience.

In some embodiments, as shown in FIGS. 1 and 9, in the second direction Y, the virtual register 12 overlaps the pixel circuit P; and/or, in the second direction Y, the virtual register 12 overlaps the shift register 11; and/or, in the second direction Y, the virtual register 12 overlaps the electrostatic shielding unit 40.

The "overlapping arrangement in the second direction Y" mentioned here means that at least part of the different structures are located at the same position in the first direction X, so that the projections of the different structures in the thickness direction Z of the array substrate 100 overlap in the second direction Y.

In the embodiments of the present application, the virtual register 12 can be selectively overlaps at least one of the pixel circuit P, the shift register 11 and the electrostatic shielding unit 40 in the second direction Y, which is conducive to reducing the risk of increasing the size of the array substrate 100 in the first direction X due to the existence of the virtual register 12. While satisfying the rationality of the internal structure layout of the array substrate 100, it is conducive to reducing the size of the display panel 200 formed subsequently in the first direction X, thereby improving the feel of use.

In some optional embodiments, in the second direction Y, the virtual register 12 overlaps the pixel circuit P, the shift register 11 and the electrostatic shielding unit 40.

In some embodiments, the electrostatic shielding unit 40 includes a first signal end and a second signal end, the first signal end is configured to receive a low voltage signal VGL1, and the second signal end is configured to receive a high voltage signal VGH1, wherein the first signal ends of at least part of the electrostatic shielding units 40 receive different low voltage signals VGL1; and/or, the second signal ends of at least part of the different electrostatic shielding units 40 receive different high voltage signals VGH1.

In conjunction with FIG. 8, the first signal end is the first electrode of the transistor T9, and the second signal end is the control end and the first electrode of the transistor T10. The array substrate 100 generally includes multiple electrostatic shielding units 40, and different electrostatic shielding units 40 are used to achieve electrostatic shielding effects of different device structures or signal traces. On this basis, in the embodiments of the present application, different first signal ends are arranged to receive different low voltage signals VGL1, or different second signal ends are arranged to receive different high voltage signals VGH1 for different electrostatic shielding units 40, so that the signals of different electrostatic shielding units 40 can be independent from one another, thereby reducing the mutual influence between different electrostatic shielding units 40 and their corresponding device structures or signal traces, and improving the operational reliability of the internal structure of the array substrate 100.

In some embodiments, the pixel circuit P includes an amplitude modulation subcircuit P2 and a pulse width modulation subcircuit P1, and the multiple gate driving circuits 10 include a fourth type of gate driving circuit for controlling the pulse width modulation subcircuit P1, and a fifth type of gate driving circuit for controlling the amplitude modulation subcircuit P2. The multiple electrostatic shielding units 40 include a first type of electrostatic shielding unit and a second type of electrostatic shielding unit, the first type of electrostatic shielding unit is electrically connected to the output end of the virtual register 12 of the fourth type of gate driving circuit, and the second type of electrostatic shielding unit is electrically connected to the output end of the virtual register 12 of the fifth type of gate driving circuit; wherein the first signal end of the first type of electrostatic shielding unit and the first signal end of the second type of electrostatic shielding unit receive different low voltage signals VGL1; and/or, the second signal end of the first type of electrostatic shielding unit and the second signal end of the second type of electrostatic shielding unit receive different high voltage signals VGH1.

The fourth type of gate driving circuit and the fifth type of gate driving circuit are gate driving circuits 10 that drive and control the pulse width modulation subcircuit P1 and the amplitude modulation subcircuit P2 respectively. In conjunction with FIG. 3A, the fourth type of gate driving circuit includes at least a first gate driving circuit and a third gate driving circuit, the output end of the first gate driving circuit can transmit the second scanning signal PWM-S2 to the control end of the first data writing transistor M2 through a signal trace, and the output end of the third gate driving circuit can transmit the first scanning signal PWM-S1 to the control end of the first gate reset transistor M5 through a signal trace.

Furthermore, according to different actual needs, the fourth type of gate driving circuit can also selectively include at least one of the fifth gate driving circuit and the seventh gate driving circuit, the fifth gate driving circuit is used to transmit the first light-emitting control signal PWM-EM to the control ends of the first control transistor M1 and the second control transistor M6, and the seventh gate driving circuit is used to transmit the frequency sweep signal SWEEP to the second electrode plate of the storage capacitor Cst. In other embodiments, the fourth type of gate driving circuit may not include the fifth gate driving circuit and the seventh gate driving circuit.

The fifth type of gate driving circuit includes at least the second gate driving circuit and the fourth gate driving circuit, the output end of the second gate driving circuit can transmit the fourth scanning signal PAM-S2 to the control end of the second data writing transistor M8 through the signal trace, and the output end of the fourth gate driving circuit can transmit the third scanning signal PAM-S1 to the control end of the second gate reset transistor M11 through the signal trace.

Furthermore, according to different actual needs, the fifth type of gate driving circuit can also selectively include the sixth gate driving circuit, the sixth gate driving circuit is used to transmit the second light-emitting control signal PAM-EM to the control ends of the third control transistor M7 and the fourth control transistor M12. In other embodiments, the fifth type of gate driving circuit may not include the sixth gate driving circuit.

In the embodiments of the present application, the fourth type of gate driving circuit and the fifth type of gate driving circuit are gate driving circuits 10 that drive and control the pulse width modulation subcircuit P1 and the amplitude modulation subcircuit P2 respectively. On this basis, by setting the first signal end of the first type of electrostatic shielding unit corresponding to the fourth type of gate driving circuit, the first signal end of the second type of electrostatic shielding unit corresponding to the fifth type of gate driving circuit to receive different low voltage signals VGL1, or setting the second signal end of the first type of electrostatic shielding unit and the second signal end of the second type of electrostatic shielding unit to receive different high voltage signals VGH1, which is conducive to improving the signal independence of the fourth type of gate driving circuit and the first type of electrostatic shielding unit with respect to the fifth type of gate driving circuit and the second type of electrostatic shielding unit, reducing the risk of mutual influence between the fourth type of gate driving circuit and the fifth type of gate driving circuit, and improving the operating reliability of the pixel circuit P.

Figure 12:
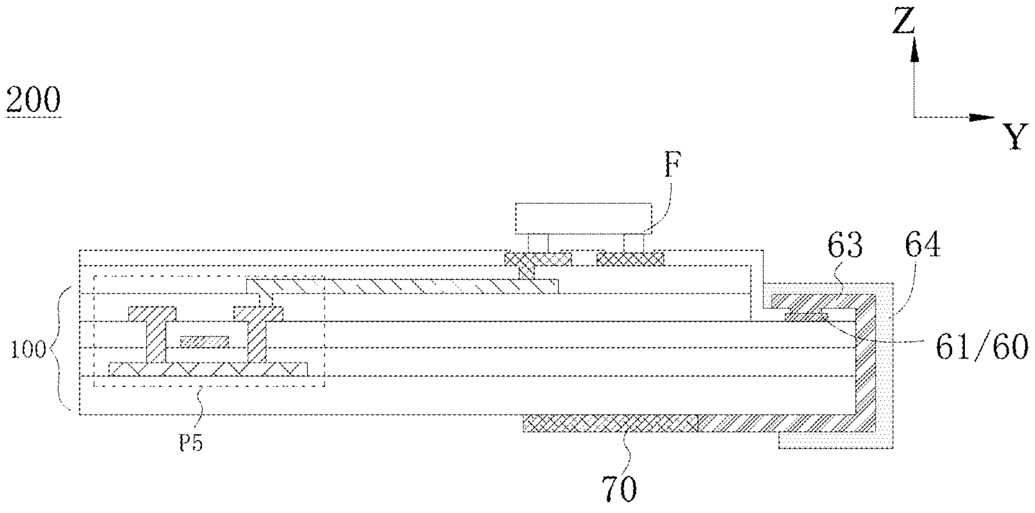
FIG. 12 is a schematic diagram of a partial cross-sectional structure of a display panel provided in an embodiment of the present application.

In the second aspect, refer to FIG. 12, a display panel 200 is provided in the embodiments of the present application, and the display panel 200 includes the array substrate 100 and a light-emitting element in any one of the aforementioned embodiments.

It should be noted that the display panel 200 provided in the embodiments of the present application has the beneficial effects of the array substrate 100 in any one of the aforementioned embodiments. Refer to the aforementioned description of the beneficial effects of the array substrate 100 for details, and the embodiments of the present application are repeated.

In some embodiments, the light-emitting element includes a micro-light-emitting diode.

In the embodiments of the present application, the display panel 200 adopts a micro-light-emitting diode to realize the light-emitting display function. In this case, the display panel 200 can be designed as a borderless display panel 200, that is, the display panel 200 does not include a border area for disposing the virtual pixel circuit P. In view of this, there may be only a virtual register 12 in the array substrate 100, but no virtual pixel circuit P, which can not only meet the requirements of borderless display, but also isolate the shift register 11 at the last row from the detection signal line 20 by means of the virtual register 12, reduce the load influence at the output end of the detection signal line 20 on the shift register 11 at the last row, reduce the load difference at the output end of the shift register 11 at the last row with respect to shift registers 11 at other rows, thereby reducing the display difference of the last row or several rows of light-emitting elements with respect to light-emitting elements at other rows, and improving the display uniformity of the display panel 200.

Figure 13:
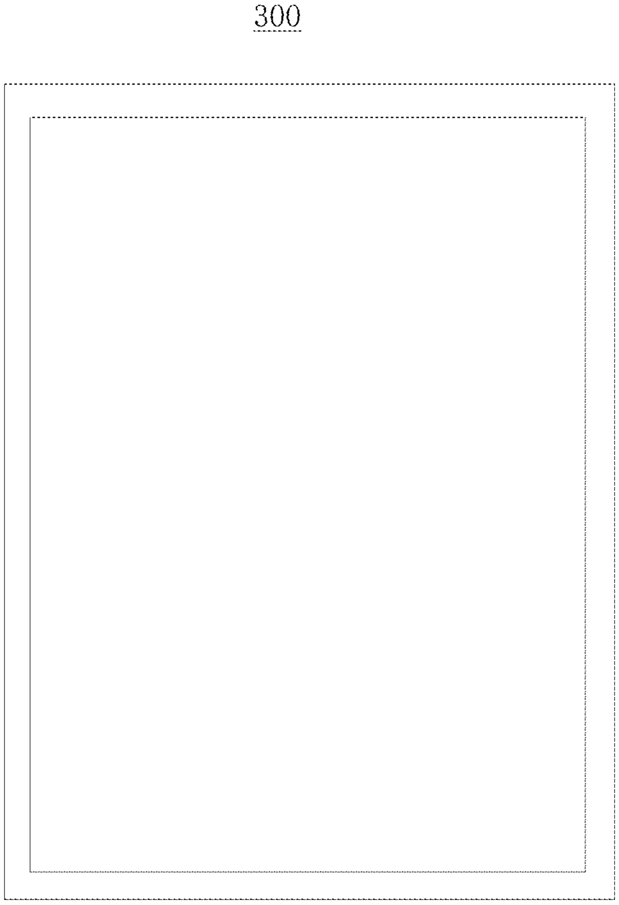
FIG. 13 is a structural schematic diagram of a display apparatus provided in an embodiment of the present application.

In the third aspect, refer to FIG. 13, a display apparatus 300 is provided in the embodiments of the present application, and the display apparatus 300 includes the display panel 200 in any one of the aforementioned embodiments.

It should be noted that the display apparatus 300 provided in the embodiments of the present application has the beneficial effects of the display panel 200 in any one of the aforementioned embodiments. Refer to the aforementioned description of the beneficial effects of the array substrate 100 and the display panel 200, and the embodiments of the present application are not repeated.

Although the embodiments disclosed in the present application are as above, the contents described are only the embodiments adopted for the convenience of understanding the present application, and are not used to limit the present application Any those skilled in the art to which the present application belongs can make any modifications and changes in the form and details of the implementation without departing from the gist and scope disclosed in the present application, but the protection scope of the present application shall still be subject to the scope defined by the attached claims.

The above are only specific embodiments of the present application. Those skilled in the art can clearly understand that for the convenience and simplicity of description, the replacement of other connection methods described above can be referred to the corresponding process in the aforementioned method embodiments, and are not repeated here. It should be understood that the protection scope of the present application is not limited to this. Any technician familiar with the technical field can easily think of various equivalent modifications or replacements within the technical scope disclosed in the present application, and these modifications or replacements should be covered within the protection scope in the present application.

What is claimed is:

1. An array substrate, comprising:

a gate driving circuit, comprising a shift register group and a virtual register, the shift register group comprising N shift registers arranged in cascade, and the virtual register being cascaded to the shift register at an N-th stage; and a detection signal line, the detection signal line being electrically connected to an output end of the virtual register, wherein the array substrate further comprises M circuit rows, wherein the array substrate comprises a plurality of pixel circuits, the circuit row comprises a plurality of pixel circuits arranged along a first direction, and the M circuit rows are arranged in a second direction, the first direction and the second direction are both parallel to a plane where the array substrate is located and intersect with each other;

wherein in the second direction, the shift register is located between the adjacent circuit rows; or, the array substrate comprises a plurality of circuit columns, the circuit column comprising a plurality of pixel circuits arranged along the second direction, and in the first direction, the shift register is located between the adjacent circuit columns.

2. The array substrate according to claim 1, wherein in the second direction, the shift register is located between the adjacent circuit rows, and the M-th circuit row is located between the shift register at the N-th stage and the virtual register.

3. The array substrate according to claim 1, further comprising a plurality of electrode structures, the electrode structure comprises a first connection electrode and a second connection electrode that are insulated, and the second connection electrode is connected to the pixel circuit;

a plurality of the electrode structures comprise a first electrode group connected to the M-th circuit row, and in the second direction, the virtual register is located between the first electrode group and the M-th circuit row.

4. The array substrate according to claim 1, wherein the shift register at the N-th stage provides a gate control signal to the M-th circuit row, or,

N≤M.

5. The array substrate according to claim 1, the array substrate satisfies at least one of the following:

circuit structures of the virtual registers in at least part of the different gate driving circuits are different;

or, circuit structures of the virtual registers in at least part of the different gate driving circuits remain consistent.

6. The array substrate according to claim 5, the array substrate satisfies at least one of the following:

in the single gate driving circuit, the circuit structure in the virtual register is consistent with the circuit structure in the shift register;

or, in the single gate driving circuit, the virtual register and the shift register have a same size in the first direction;

or, in the single gate driving circuit, the virtual register and the shift register have a same size in the second direction.

7. The array substrate according to claim 1, wherein the array substrate comprises a plurality of the gate driving circuits, the plurality of the gate driving circuits comprise a first type of gate driving circuit and a second type of gate driving circuit, the first type of gate driving circuit is configured to control a data signal to be written into the pixel circuit, and the second type of gate driving circuit is configured to control a reset signal to be written into the pixel circuit;

wherein at least one of the first type of gate driving circuit and the second type of gate driving circuit comprises the virtual register.

8. The array substrate according to claim 7, wherein the pixel circuit comprises an amplitude modulation subcircuit and a pulse width modulation subcircuit, the first type of gate driving circuit comprises a first gate driving circuit and a second gate driving circuit, and the second type of gate driving circuit comprises a third gate driving circuit and a fourth gate driving circuit;

the first gate driving circuit is configured to control a first data signal to be written into the pulse width modulation subcircuit, the second gate driving circuit is configured to control a second data signal to be written into the amplitude modulation subcircuit, the third gate driving circuit is configured to control a first reset signal to be written into the pulse width modulation subcircuit, and the fourth gate driving circuit is configured to control a second reset signal to be written into the amplitude modulation subcircuit.

9. The array substrate according to claim 7, wherein the first type of gate driving circuit comprises a first virtual register, the second type of gate driving circuit comprises a second virtual register, and a circuit structure in the first virtual register is consistent with a circuit structure in the second virtual register; or, wherein a plurality of the gate driving circuits further comprise a third type of gate driving circuit, the third type of gate driving circuit is configured to output a light-emitting control signal or a frequency sweep signal, the first type of gate driving circuit comprises a first virtual register, and the third type of gate driving circuit comprises a third virtual register;

wherein circuit structures of the first virtual register and the third virtual register are different.

10. The array substrate according to claim 1, further comprising an electrostatic shielding unit, and an output end of the virtual register is electrically connected to the detection signal line through the electrostatic shielding unit.

11. The array substrate according to claim 10, wherein the detection signal line comprises a first trace, the first trace comprises a first sub-portion extending along the first direction and a connecting portion connecting the first sub-portion and the electrostatic shielding unit, wherein in the second direction, the first sub-portion is located between the electrostatic shielding unit and the virtual register.

12. The array substrate according to claim 11, wherein the detection signal line further comprises a second trace, the second trace is connected to at least one of the electrostatic shielding unit and the first trace, and at least part of structure in the second trace extends along the second direction and away from the gate driving circuit.

13. The array substrate according to claim 10, further comprising a plurality of electrode structures, the electrode structure comprises a first connection electrode and a second connection electrode that are insulated, and the second connection electrode is connected to the pixel circuit;

a plurality of the electrode structures comprise a first electrode group connected to the M-th circuit row, and in the second direction, the electrostatic shielding unit is located between the first electrode group and the virtual register.

14. The array substrate according to claim 10, wherein in the second direction, the virtual register is located between the M-th circuit row and the electrostatic shielding unit, and in the second direction, a distance between the virtual register and the electrostatic shielding unit is greater than a distance between the virtual register and the M-th circuit row.

15. The array substrate according to claim 10, further comprising a substrate, a plurality of electrode structures and a plurality of bonding pad structures, the electrode structure comprises a first connection electrode and a second connection electrode that are insulated, the second connection electrode is connected to the pixel circuit;

the bonding pad structure comprises a first bonding pad, the first bonding pad and the electrode structure are located at a same side of the substrate;

a plurality of the electrode structures comprise a first electrode group connected to the M-th circuit row, in the second direction, the first electrode group is located between the first bonding pad and the electrostatic shielding unit, and in the second direction, a distance between the first electrode group and the electrostatic shielding unit is greater than a distance between the first electrode group and the first bonding pad.

16. The array substrate according to claim 10, wherein the electrostatic shielding unit comprises a first signal end and a second signal end, the first signal end is configured to receive a low voltage signal, and the second signal end is configured to receive a high voltage signal;

wherein the first signal ends of at least part of the different electrostatic shielding units receive different low voltage signals; and/or, the second signal ends of at least part of the different electrostatic shielding units receive different high voltage signals.

17. A display panel, comprising the array substrate according to claim 1 and a light-emitting element.

18. A display apparatus, comprising the display panel according to claim 17.

19. An array substrate, comprising:

a gate driving circuit, comprising a shift register group and a virtual register, the shift register group comprising N shift registers arranged in cascade, and the virtual register being cascaded to the shift register at an N-th stage; and a detection signal line, the detection signal line being electrically connected to an output end of the virtual register, wherein the array substrate comprises a plurality of the gate driving circuits, the plurality of the gate driving circuits comprise a first type of gate driving circuit and a second type of gate driving circuit, the first type of gate driving circuit is configured to control a data signal to be written into the pixel circuit, and the second type of gate driving circuit is configured to control a reset signal to be written into the pixel circuit;

wherein at least one of the first type of gate driving circuit and the second type of gate driving circuit comprises the virtual register.

20. An array substrate, comprising:

a gate driving circuit, comprising a shift register group and a virtual register, the shift register group comprising N shift registers arranged in cascade, and the virtual register being cascaded to the shift register at an N-th stage; and a detection signal line, the detection signal line being electrically connected to an output end of the virtual register, wherein the array substrate further comprises an electrostatic shielding unit, and an output end of the virtual register is electrically connected to the detection signal line through the electrostatic shielding unit.

* * * * *